US 6,724,385 B2

(12) United States Patent
Takatsuka et al.

(10) Patent No.: US 6,724,385 B2
(45) Date of Patent: Apr. 20, 2004

(54) METHOD OF REPLAYING GAME, RECORDING MEDIUM, PROGRAM, AND ENTERTAINMENT SYSTEM

(75) Inventors: Susumu Takatsuka, Tokyo (JP); Katsuyuki Kanetaka, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 487 days.

(21) Appl. No.: 09/799,771

(22) Filed: Mar. 5, 2001

(65) Prior Publication Data
US 2002/0015040 A1 Feb. 7, 2002

(30) Foreign Application Priority Data
Mar. 8, 2000 (JP) ........................................ 2000-064211

(51) Int. Cl.$^7$ ............................................. G06T 15/00
(52) U.S. Cl. ...................................................... 345/427
(58) Field of Search ................................. 345/418, 419, 345/427, 619; 463/30, 31, 32, 36

(56) References Cited
U.S. PATENT DOCUMENTS

| | | | |
|---|---|---|---|
| 4,342,454 A | 8/1982 | Baer et al. | 273/999 |
| 5,269,687 A | 12/1993 | Mott et al. | 434/69 |
| 5,366,376 A | 11/1994 | Copperman et al. | 434/69 |
| 5,395,242 A | 3/1995 | Slye et al. | 434/43 |
| 5,507,485 A | 4/1996 | Fisher | 273/320 |
| 5,558,339 A | 9/1996 | Perlman | 273/439 |
| 5,687,307 A | 11/1997 | Akisada et al. | 345/137 |
| 5,717,848 A | 2/1998 | Watanabe et al. | 395/714 |
| 5,779,548 A | 7/1998 | Asai et al. | 463/31 |
| 5,793,371 A | 8/1998 | Deering | 345/418 |
| 5,835,096 A | 11/1998 | Baldwin | 345/430 |
| 5,999,185 A | 12/1999 | Kato et al. | 345/420 |
| 6,118,452 A | 9/2000 | Gannett | 345/418 |
| 6,141,725 A | 10/2000 | Tucker et al. | 711/100 |

(List continued on next page.)

FOREIGN PATENT DOCUMENTS

| | | |
|---|---|---|
| EP | 0 778 536 A2 | 6/1997 |
| EP | 0 782 104 A1 | 7/1997 |
| JP | 5-282279 A | 10/1993 |
| JP | 7-213744 A | 8/1995 |
| JP | 8-083352 A | 3/1996 |
| JP | 9-81772 | 3/1997 |
| JP | 11-39509 A | 2/1999 |
| JP | 11-073527 A | 3/1999 |
| WO | WO 97/42601 | 11/1997 |

OTHER PUBLICATIONS

Jim Fedor et al.; Links 386 CD Players Manual; Access Software Inc.; pp. 1–87; 1995.
Yukiyoshi Ike Sato; New Look: Playstation 2 Fantavision; Feb. 9, 2000; p. 1; Retrieved Oct. 3, 2001 from the internet at: <http://gamespot.com/gamespot/stories/news/0,10870,2446504,00.html>.
Japanese Patent Office; "Rejection of the Application", mailing date Jan. 7, 2003, including 2–page English translation of portions; (4 pgs.).
Japanese Patent Office; Office Action Mailing No. 139871; Mailing Date May 14, 2002 (partial translation of pentinent portions included).

(List continued on next page.)

Primary Examiner—Phu K. Nguyen
(74) Attorney, Agent, or Firm—Fitch, Even, Tabin & Flannery

(57) ABSTRACT

Images can be replayed from various viewpoints when games of various genres are replayed. When a game is replayed, a memory control unit holds only a certain replayable region with respect to a present camera viewpoint position successively in a RAM. If there is an instruction from a manual controller while the game is being replayed, a camera viewpoint moving unit moves the camera viewpoint position of a hypothetical camera on a given path corresponding to the instruction among a plurality of predetermined paths in the replayable region. The instruction from the manual controller can be entered interactively when the game is replayed.

16 Claims, 32 Drawing Sheets

U.S. PATENT DOCUMENTS

| | | | | |
|---|---|---|---|---|
| 6,146,143 | A | 11/2000 | Huston et al. | 434/62 |
| 6,215,500 | B1 | 4/2001 | Deering | 15/344 |
| 6,231,443 | B1 | 5/2001 | Asai et al. | 463/32 |
| 6,256,041 | B1 | 7/2001 | Deering | 345/426 |
| 6,280,323 | B1 | 8/2001 | Yamazaki et al. | 463/4 |
| 6,389,504 | B1 | 5/2002 | Tucker et al. | 711/100 |
| 6,419,581 | B2 * | 7/2002 | Asai et al. | 463/32 |
| 2001/0020947 | A1 | 9/2001 | Kurihara | 345/582 |
| 2001/0023201 | A1 | 9/2001 | Takatsuka et al. | 463/31 |

OTHER PUBLICATIONS

FantaVision; "Impressions, screens, and movies of the righteous multiplayer mode in SCEA's PS2 launch puzzler"; PlayStation 2: FantaVision [online]; Oct. 18, 2000; Retrieved from the Internet on <URL: http://ps2.ign.com/articles/133/133857p1.html>, pp. 1–3; Retrieved from the Internet on March 31, 2003.

Fantavision FAQ/Guide/Whatever [online]; Aug. 20, 2000; Retrieved from the Internet on <URL: http://db.game-faqs.com/console/ps2/file/fantavision.txt>, pp. 1–5; Retrieved from the Internet on Mar. 31, 2003.

FantaVision Import Review; "This quirky little variation on Missile Command is one of the PS2's best games"; PlayStation 2: FantaVision [online]; May 1, 2000; Retrieved from the Internet on <URL: http://ps2.ign.com/articles/078/078707p1.html>, pp. 1–2; Retrieved from the Internet on Mar. 31, 2003.

"Fantavision: The rockets' red glare, the bombs bursting in air . . . Only in Japan?"; http://www.maxpages.com/ffono-line/Fantavision ; Feb. 17, 2000; p. 1.

"Fantavision"; Instruction Manual; Playback of Replay Data and Normal Replay Mode; date unknown; p. 26–29 (with 3–page full English translation included).

"Weekly Famitsu"; Fantavision; ASCII, No. 584; Feb. 25, 2000; p. 22–23, 25 (with 7–page full English translation included).

European Patent Office; European Search Report; citied in corresponding European Patent Application No. EP 01 30 2140; dated May 7, 2003; (5 pages).

Japanese Patent Office; "Rejection of the Application"; Mailing No. 092718; Mailing Date: Mar. 25, 2003; 7 pages (including 3–page English translation of portions).

H. Nishino et al.; "A 3D Virtual Environment for Creating New Fireworks"; *Virtual Reality Software and Technology '96*; Proceedings of the VRST Conference; Jul. 1, 1996; pp. 43–50.

LOGiN Magazine; "Full coverage of the Latest Game!! Air Combat II"; ASCII Corporation; vol. 10, No. 12; Jun. 21, 1991; pp. 130–133.

M. N. M. Software; "Star Wars Attack on the Death Star"; 1991; pp. 1–10.

* cited by examiner

FIG. 19A
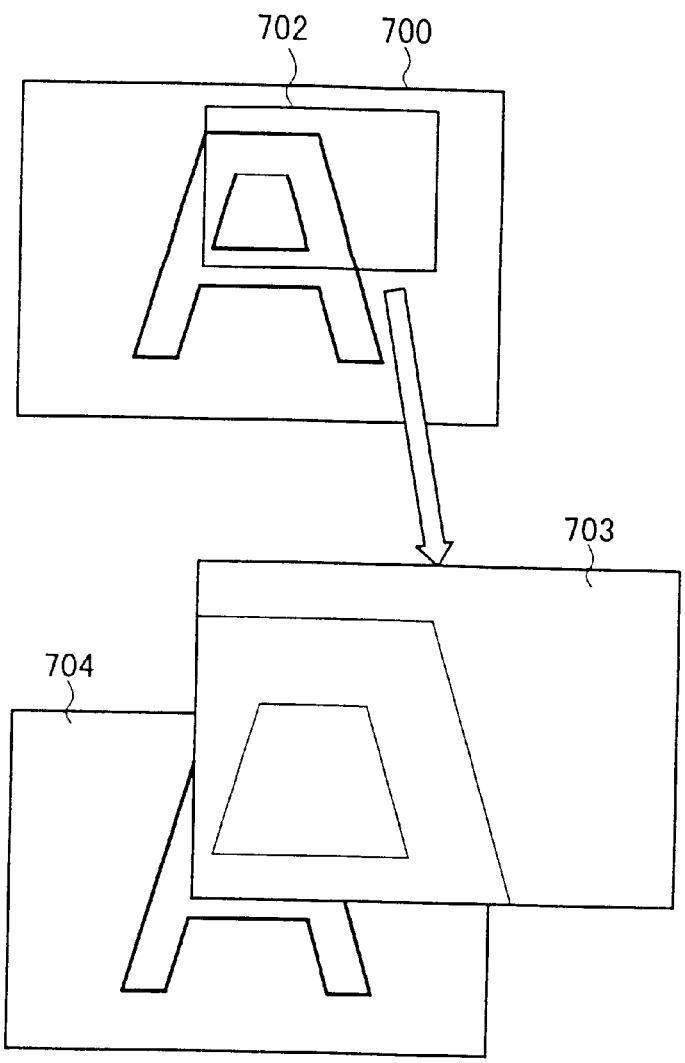
FIG. 19B
FIG. 19C
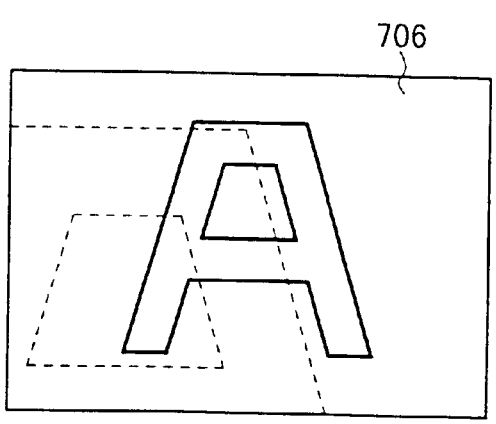

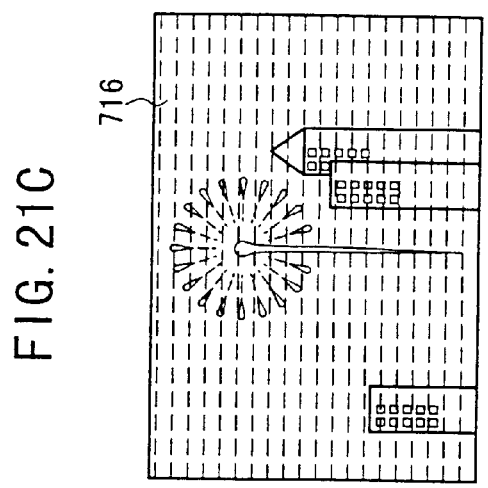
FIG. 21C
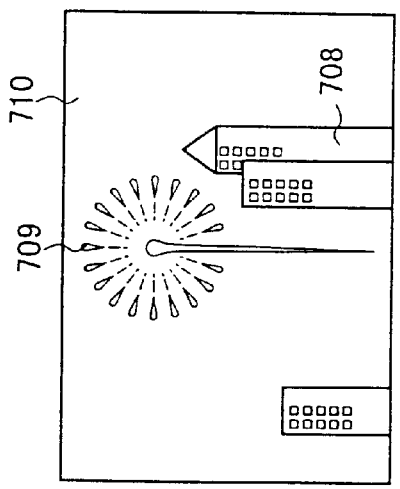
FIG. 21A
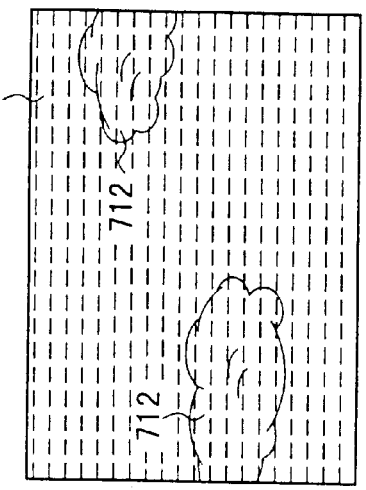
FIG. 21B

SNOW

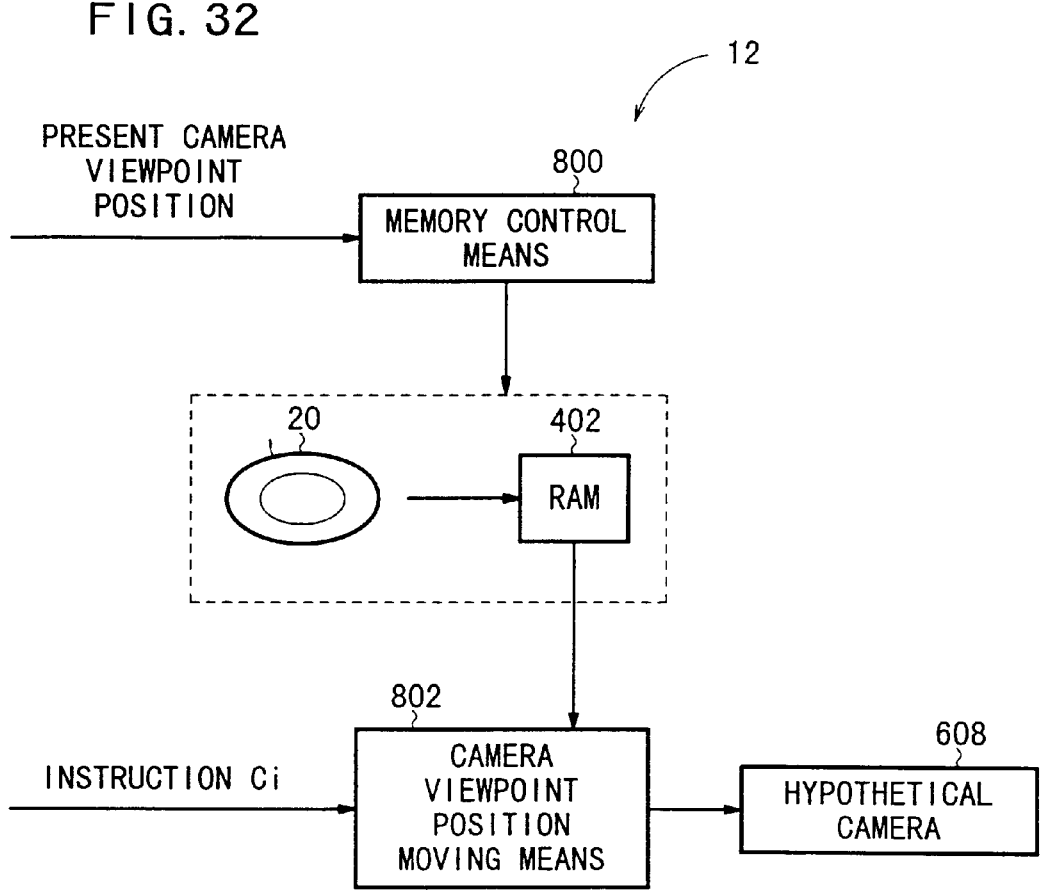

METHOD OF REPLAYING GAME, RECORDING MEDIUM, PROGRAM, AND ENTERTAINMENT SYSTEM

BACKGROUND OF THE INVENTION

1. Field of the Invention

The present invention relates to a method of replaying a game program after it has been executed by a computer, for example, a recording medium which stores a program relative to the game replaying method, a program relative to the game replaying method, and an entertainment system for carrying out the game replaying process.

2. Description of the Related Art

Simulation video games for driving vehicles such as automobiles, airplanes, etc. and for golf games are commercially available in recording mediums such as CD-ROMs or the like which incorporate a replay mode program for allowing the game player or user to replay the game on the display screen while the game is being played or after the game has been played.

The replay mode permits the game layer to improve its own game playing skill and also to feel more satisfied about the result of the game.

However, since images of the played game are played back from only one fixed camera viewpoint programmed in a certain situation in the conventional replay mode, the game player finds the conventional replay mode somewhat dull and boring.

SUMMARY OF THE INVENTION

It is therefore an object of the present invention to provide a method of replaying a game, a recording medium, a program, and an entertainment system which make it possible to replay images from various viewpoints when games of various genres are replayed.

According to the present invention, there is provided a method of replaying a game, comprising the steps of holding only a certain replayable region with respect to a present camera viewpoint position successively in a memory when a game is replayed to move a camera viewpoint in three-dimensional computer graphics with a computer (12) capable of executing a game program, and moving the camera viewpoint on a given path in the replayable region in response to a control action of a manual controller which sends instructions to the computer when the game is replayed.

According to the present invention, there is also provided a recording medium storing a game program which can be executed by a computer, the game program comprising the steps of holding only a certain replayable region with respect to a present camera viewpoint position successively in a memory when a game is replayed to move a camera viewpoint in three-dimensional computer graphics, and moving the camera viewpoint on a given path in the replayable region in response to a control action of a manual controller which sends instructions to the computer when the game is replayed.

According to the present invention, there is further provided a game program which can be executed by a computer, comprising the steps of holding only a certain replayable region with respect to a present camera viewpoint position successively in a memory when a game is replayed to move a camera viewpoint in three-dimensional computer graphics, and moving the camera viewpoint on a given path in the replayable region in response to a control action of a manual controller which sends instructions to the computer when the game is replayed.

According to the present invention, there is further provided an entertainment system comprising an entertainment apparatus for executing various programs, a manual controller for sending control requests from the user to the entertainment apparatus, and a display unit for displaying a three-dimensional graphics image outputted from the entertainment apparatus, the entertainment apparatus comprising memory control means for holding only a certain replayable region with respect to a present camera viewpoint position successively in a memory when a game is replayed to move a camera viewpoint in three-dimensional computer graphics by the entertainment apparatus, and camera viewpoint moving means for moving the camera viewpoint on a given path in the replayable region in response to a control action of a manual controller which sends instructions to the computer when the game is replayed.

While a game is being displayed, only a certain replayable region with respect to a present camera viewpoint position is successively held in the memory, and the camera viewpoint is moved on the given path in the replayable region in response to a control action of the manual controller. Therefore, an image can be replayed from various viewpoints with the camera viewpoint moving on the given path. It is possible to replay the game in its entirety. Various game genres to which the principles of the present invention are applicable include genres of simulation games, action games, puzzle games, action puzzle games, etc.

Holding the replayable region successively in the memory means using the memory as an FIFO (First In, First Out) memory and keeping a constant amount of scene data in the memory by writing an amount of new data and erasing (discarding) the same amount of old data.

If one of a plurality of given paths can be selected with the manual controller, then an image can be replayed from various viewpoints.

When a certain control action is made by the manual controller, the camera viewpoint is moved on the given path from the present camera viewpoint position and thereafter returned to the present camera viewpoint position. The game player as the user can thus easily confirm the position or time to start replaying the game.

If a map with a specified camera viewpoint is synthesized and displayed on the replayed image, the position, i.e., the time, to start replaying the game can accurately be confirmed.

With a firework object included in the field of view of the camera, it is possible for the user to see or appreciate the firework from various positions.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 19A through 19C are views showing the principles of the overlapping process;

FIGS. 21A through 21C are views showing the principles of the misting process;

FIG. 32 is a functional block diagram showing an arrangement in principle of a game program.

DESCRIPTION OF THE PREFERRED EMBODIMENT

Figure 1:
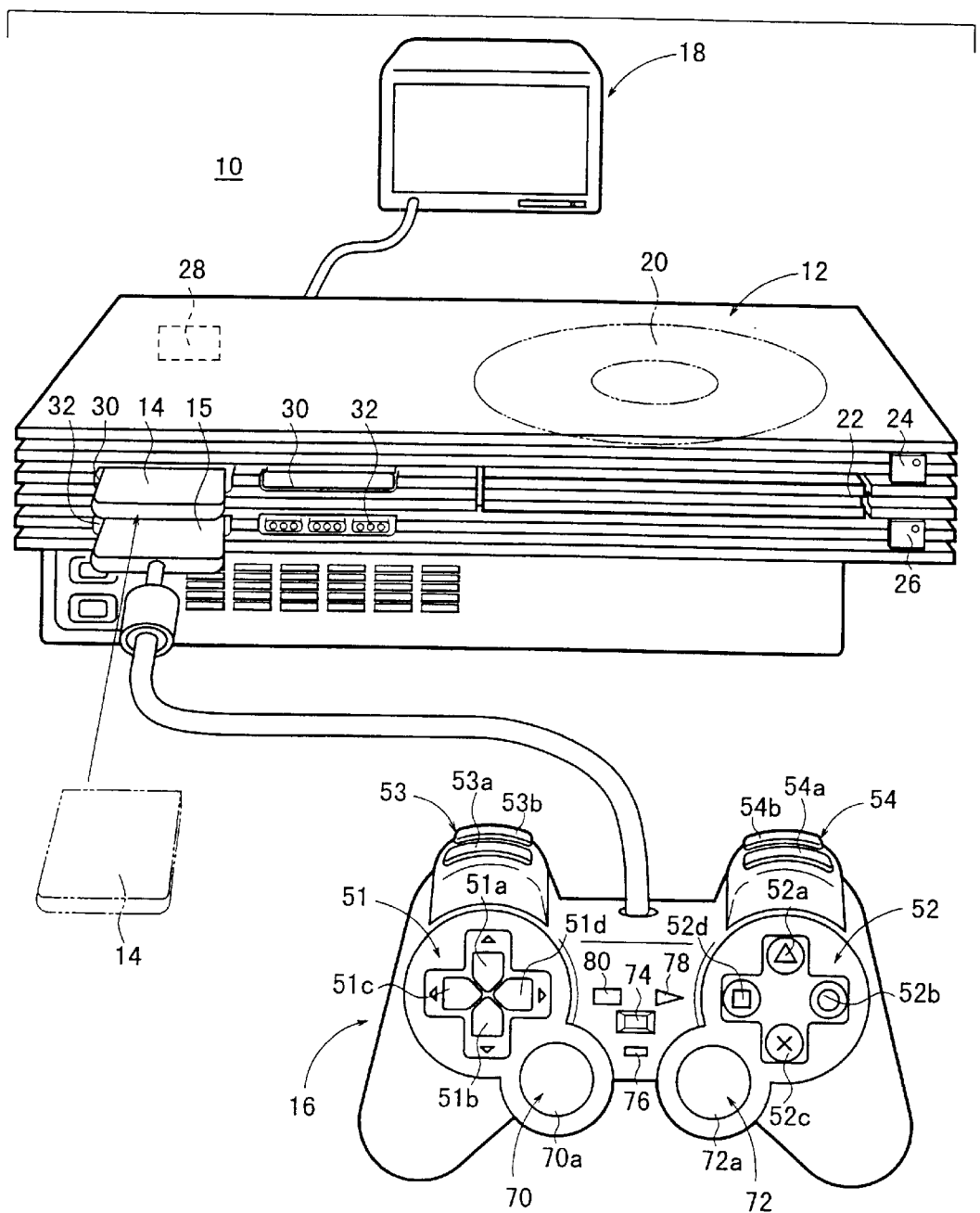
FIG. 1 is a perspective view of an entertainment system according to an embodiment of the present invention.

FIG. 1 shows in perspective an entertainment system 10 according to an embodiment of the present invention.

As shown in FIG. 1, the entertainment system 10 basically comprises an entertainment apparatus 12 having a function to execute various programs, a memory card 14 as a card-type external storage unit (external memory) removably connected to the entertainment apparatus 12, a manual controller 16 detachably connected to the entertainment apparatus 12 by a connector 15, and a display monitor 18 such as a television receiver which is supplied with video and audio output signals from the entertainment apparatus 12.

The entertainment apparatus 12 has a casing substantially in the shape of a rectangular parallelepiped. The entertainment apparatus 12 has on the front panel of the casing a disk tray 22 movable into and out of the casing and serving as a disk loading unit for loading an optical disk 20 as a recording medium storing programs and data, a reset switch 24 for resetting a program that is being presently executed by the entertainment apparatus 12, an open button 26 for moving the disk tray 22 out of the casing, a pair of insertion slots 30 for receiving the memory card 14, and a pair of controller terminals 32 for receiving the connector 15 of the manual controller 16. The entertainment apparatus 12 has on the rear panel of the casing a power supply switch 28 and AV (Audio Visual) multi-output terminals (not shown) as video and audio output terminals that are connected to the display monitor 18 via an AV cable.

The entertainment apparatus 12 has various control functions including a control function to read a computer game (video game) program from the optical disk 20 as a recording medium such as a CD-ROM, DVD-ROM, etc. which stores such a computer game program and data, and execute the computer game program to display characters and scenes on the display monitor 18, a control function to play back movies recorded on other optical disks 20 such as DVDs (Digital Video Disks), and a control function to play back music pieces recorded on optical disks 20 for CDDA (Compact Disk Digital Audio). The entertainment apparatus 12 also has a function to execute a program downloaded from a communication network. While the entertainment apparatus 12 is executing a game program, the display monitor 18 displays three-dimensional computer graphics images that are generated by the entertainment apparatus 12.

Signals sent from the manual controller 16 to the entertainment apparatus 12 are processed by one of the above control functions of the entertainment apparatus 12 to move 15 characters displayed on the display monitor 18 and change scenes displayed on the display monitor 18.

The manual controller 16 has first and second control units 51, 52 disposed in left and right areas on the upper central surface of its casing, third and fourth control units 53, 54 disposed on the front side of the casing, and left and right joysticks 70, 72 disposed in left and right areas on the upper side surface of its casing remote from the front side thereof for entering analog control actions.

The first control unit 51 comprises a pressable control unit for moving characters displayed on the display screen of the display monitor 18, and its function is set by a program recorded in the optical disk 20. The first control unit 51 comprises four control buttons (also referred to as "direction keys") 51a, 51b, 51c, 51d that the user or game player can press to move a displayed character upwardly, downwardly, leftwardly, and rightwardly on the display screen of the display monitor 18. The direction key 51a is also referred to as an upward direction key, the direction key 51b as a downward direction key, the direction key 51c as a left direction key, and the direction key 51d as a right direction key.

The second control unit 52 has four control buttons 52a, 52b, 52c, 52d each in the form of a pressable cylinder. The control buttons 52a, 52b, 52c, 52d are marked respectively with "Δ", "○", "X", "□" on their upper surfaces and are also referred to as a Δ button 52a, a ○ button 52b, an x button 52c, and a □ button 52d.

Functions of the control buttons 52a–52d of the second control unit 52 are set by the program recorded in the optical disk 20. For example, the control buttons 52a–52d are allocated respective functions to move the left arm, the right arm, the left leg, and the right leg of the displayed character.

The third and fourth control units 53, 54 are identical in structure to each other, and have two upper and lower pressable control buttons (L1, L2 buttons) 53a, 53b and two upper and lower pressable control buttons (R1, R2 buttons) 54a, 54b, respectively. Functions of the third and fourth control unit 53, 54 are also set by the program recorded in the optical disk 20. For example, the third and fourth control units 53, 54 are allocated a function to impart special motions to displayed characters.

The left and right joysticks 70, 72 are combined with respective signal input devices such as rheostats which can be swiveled 360° about their shafts. The left and right joysticks 70, 72 can be returned to their neutral position by resilient members (not shown). In the neutral position, the left and right joysticks 70, 72 serve as fifth and sixth pressable control units comprising control buttons (L3, L4 buttons) 70a, 72a, respectively.

When the left and right joysticks 70, 72 are swiveled, they enter command signals to cause a displayed character to make an analog action, i.e., to move the displayed character while rotating same, or move the displayed character at a varying speed, or change states of the displayed character.

Figure 2:
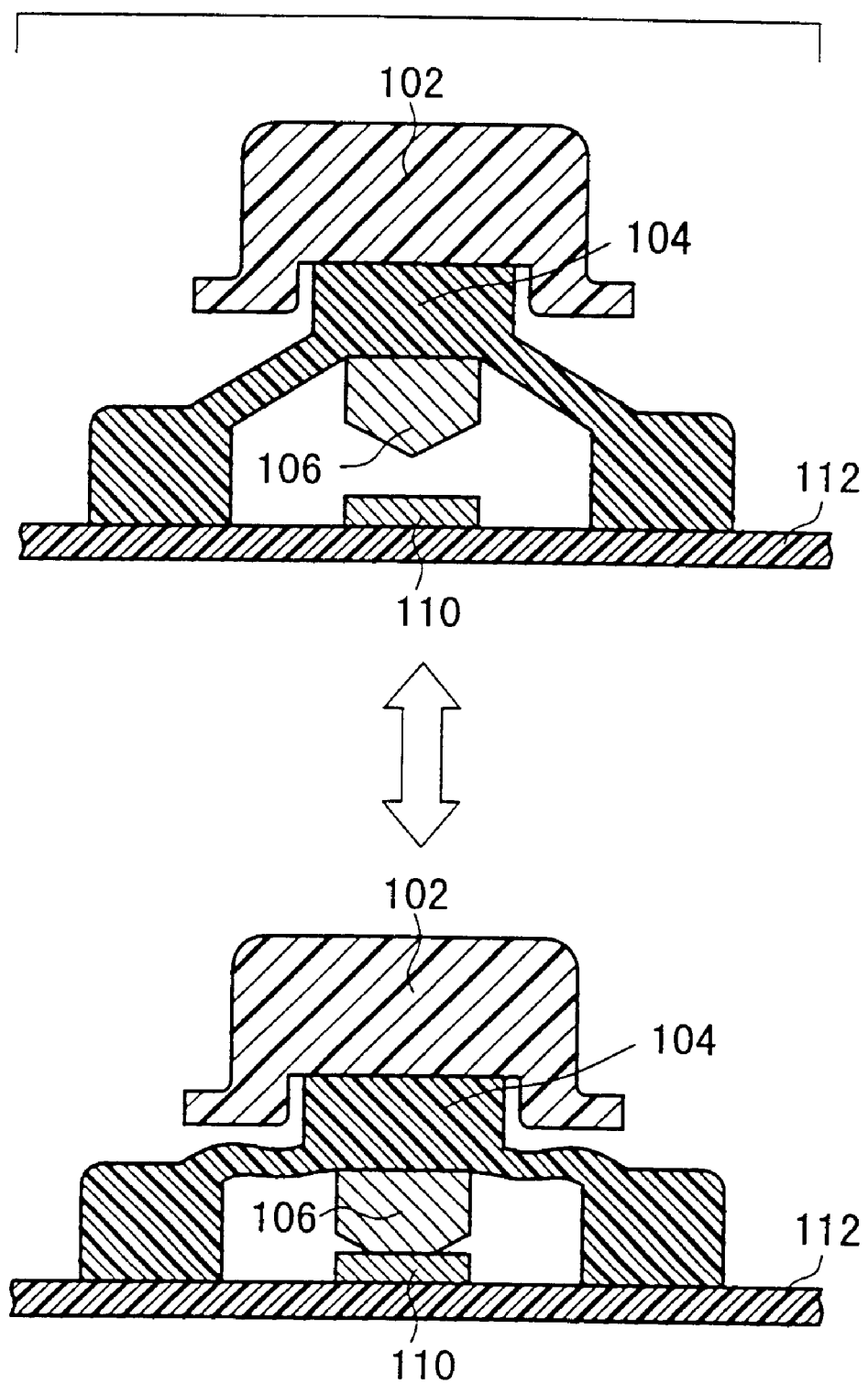
FIG. 2 is a cross-sectional view illustrative of the manner in which a pressure-sensitive device operates.

FIG. 2 shows in cross section an internal structure of a portion of the manual controller 16.

In FIG. 2, a control button 102 represents each of the direction keys 51a–51d of the first control unit 51, each of the control buttons 52a–52d of the second control unit 52, each of the L1, L2 buttons 53a, 53b, the R1, R2 buttons 54a, 54b of the third and fourth control units 53, 54, and each of the control buttons 70a, 72a of the fifth and sixth control units. A resilient electrically conductive member 106 having a downwardly tapered shape is attached to the lower surface of the control button 102 by an insulating resilient pad 104. A resistive layer (resistor) 110 is disposed downwardly of the resilient electrically conductive member 106 in vertical alignment therewith. The resistive layer 110 has an end connected to a voltage source having a voltage Vcc (see FIG. 3) and the other end connected to an end of a fixed resistive layer (resistor) 108. The resistive layer 110 is disposed on an insulating board 112. The other end of the fixed resistive layer 108 is connected to ground.

Figure 3:
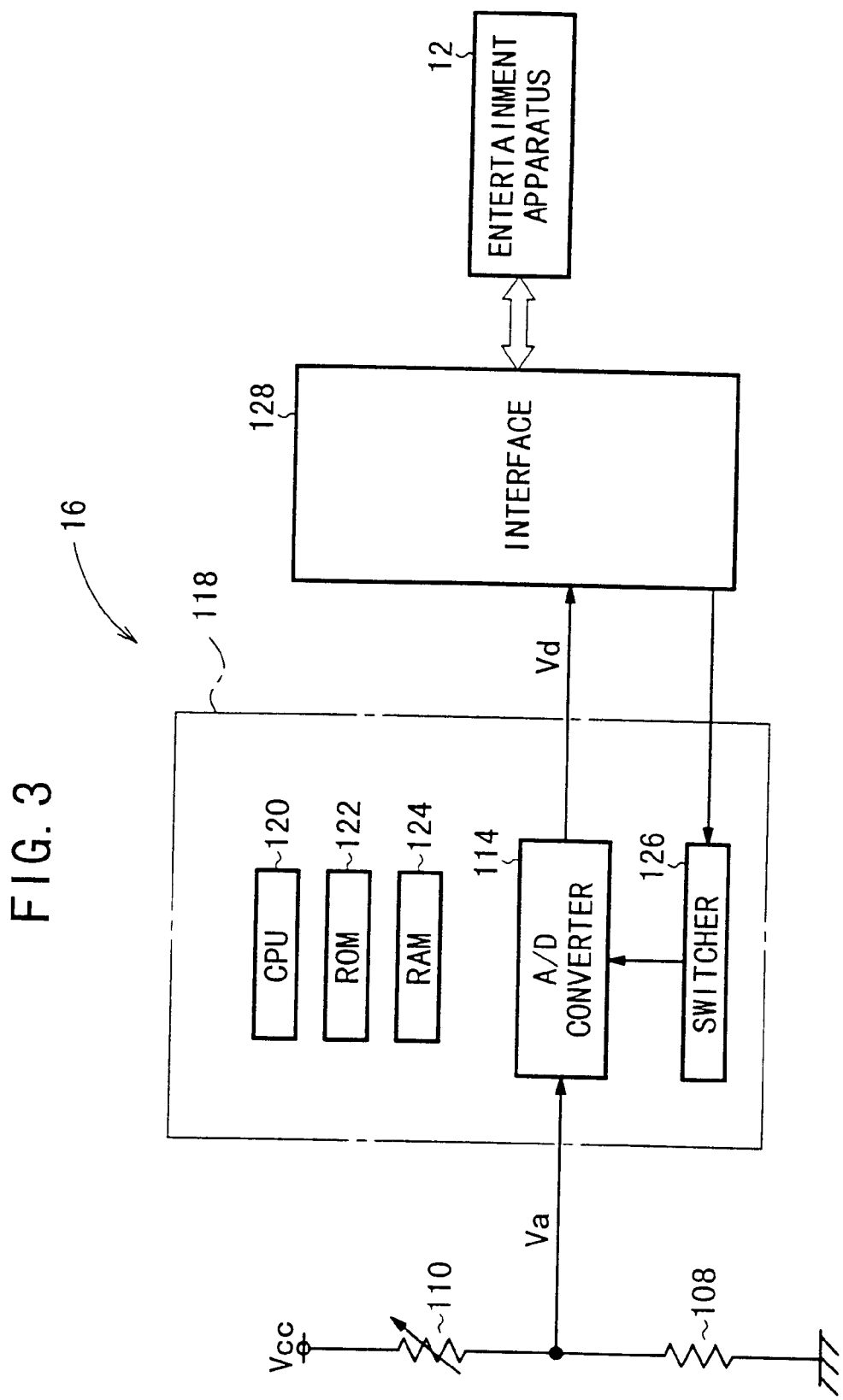
FIG. 3 is a block diagram of a circuit arrangement illustrative of the manner in which a manual controller operates.

FIG. 2 shows the manner in which the control unit operates as a pressure-sensitive element for producing a signal output proportional to the pressure applied thereto. FIG. 3 shows in block form an electric circuit arrangement of major components of the manual controller 16.

When the direction keys 51a–51d, the control buttons 52a–52d, the L1, L2 buttons 53a, 53b, the R1, R2 buttons 54a, 54b, and the control buttons 70a, 70b are pressed, i.e., when the control button 102 is pressed, the resilient electrically conductive member 106 is depressed into contact with the resistive layer 110. The resistance of the resistive layer 110 is apparently changed depending on the area of contact between the resilient electrically conductive member 106 and the resistive layer 110. As a result, a divided voltage (analog value) Va produced by the resistive layers 110, 108 is changed and applied as an input signal to an A/D converter 114 (see FIG. 3).

The resilient electrically conductive member 106 and the resistive layer 110 jointly make up a pressure-sensitive element whose electric resistance varies depending on the pressure applied from the control button 102.

As shown in FIG. 3, the manual controller 16 has an MPU (MicroProcessor Unit) 118 as a control means which comprises a CPU 120, a ROM 122, and a RAM 124, the ROM 122 and the RAM 124 being connected to the CPU 120.

The MPU 118 also has a switcher 126 whose operation is controlled by the CPU 120, and the A/D converter 114. The switcher 126 serves to switch between different functions of the A/D converter 114, as described later on. An analog signal (voltage) Va outputted from the output terminal of the resistive layer 110 is supplied to the A/D converter 114, which converts the analog signal Va into a digital signal Vd.

The digital signal Vd outputted from the A/D converter 114 is applied to an interface 128 mounted on an internal board of the manual controller 16, and transmitted from the interface 128 to the entertainment apparatus 12. The digital signal Vd supplied to the entertainment apparatus 12 serves to move the displayed character, for example.

A change in the level of the analog signal Va outputted from the output terminal of the resistive layer 110 is commensurate with a change in the pressure applied from the control button 102 by the user. Therefore, the digital signal Vd outputted from the A/D converter 114 is commensurate with the pressure applied from the control button 102 by the user. When the motion of a displayed game character, for example, is controlled by the digital signal Vd that is related to the pressure applied by the user, it is possible to achieve a smoother motion of the displayed game character than when the motion of the displayed game character is controlled by a binary digital signal of "1" or "0".

The manual controller 16 controls the switcher 126 via the interface 128 based on a control signal transmitted from the entertainment apparatus 12 according to the program recorded in the optical disk 20. Specifically, when the program recorded in the optical disk 20 is executed, the entertainment apparatus 12 outputs a control signal indicative of whether the A/D converter 114 functions as a means for outputting a multivalued digital signal Vd having one of values ranging from 0 to 255 or a means for outputting a binary digital signal Vd having a value "0" or "1", according to the program. Based on the control signal, the CPU 120 controls the switcher 126 to select one of the functions of the A/D converter 114 to produce either a binary output or a multivalued output. Consequently, whether the A/D converter 114 is to produce either a binary output or a multivalued output is determined by the program recorded in the optical disk 20.

In FIG. 1, either the left and right joysticks 70, 72 or the first and second control units 51, 52 are selected at a time by an analog mode switch 74. When the left and right joysticks 70, 72 are selected by the analog mode switch 74, an indicator 76 is turned on, indicating the selection of the left and right joysticks 70, 72.

The manual controller 16 further has a start button (start switch) 78 for instructing the entertainment apparatus 12 to start a game, and a selection button (selection switch) 80 for selecting a level of difficulty of the game before the game is started.

An internal structure of the entertainment system 10 shown in FIG. 1 and its general operation will be described below with reference to FIG. 4.

Figure 4:
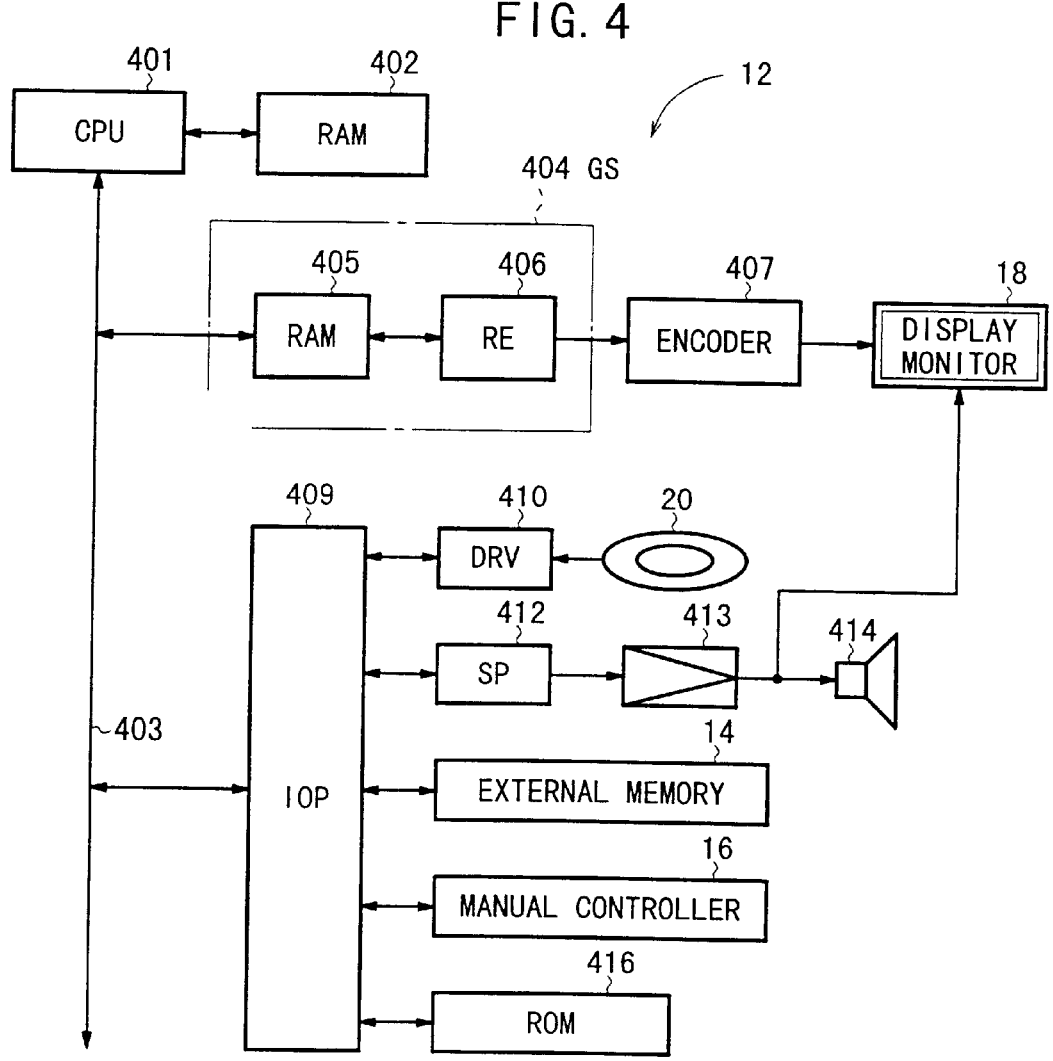
FIG. 4 is a block diagram of the entertainment system.

As shown in FIG. 4, the entertainment apparatus 12 has a CPU 401, a RAM 402 as a semiconductor memory connected to the CPU 401, and a bus 403 connected to the CPU 401. To the bus 403, there are connected a graphic synthesizer (GS) 404 and an input/output processor (IOP) 409. The graphic synthesizer 404 has a RAM 405 including a frame buffer, a Z buffer, and a texture memory, and a rendering engine (RE) 406 having a rendering function to render and store images in the frame buffer in the RAM 405.

The display monitor 18 as an external device is connected to the graphic synthesizer 404 via an encoder 407 which converts a digital RGB signal, for example, into an NTSC television signal.

To the input/output processor 409, there are connected a driver (DRV) 410 for reproducing and decoding data recorded in the optical disk 20, a sound processor (SP) 412, a memory card 514 as an external memory comprising a flash memory, the manual controller 16, and a ROM 416 which stores an operating system, etc. The sound processor 412 is connected via an amplifier 413 to a speaker 414 and the display monitor 18 which serve as external devices, and supplies an audio signal to the speaker 414 and the display monitor 18 via the amplifier 413.

The memory card 14 comprises a card-shaped external storage device comprising a CPU or a gate array and a flash memory. The memory card 14 is detachably connected to one of the insertion slots 30 of the entertainment apparatus 12 shown in FIG. 1. The memory card 14 stores interim game data and a program for playing back DVDs.

The manual controller 16 supplies commands (binary or multivalued commands) to the entertainment apparatus 12 when the user presses a plurality of control buttons on the manual controller 16. The driver 410 has a decoder for decoding images that have been encoded based on MPEG (Moving Picture Experts Group) standards.

A process of displaying an image on the display monitor 18 based on control actions that are made by the user via the manual controller 16 will be discribed in detail below. It is premised that object data comprising polygon vertex data, texture data, etc. recorded in the optical disk 20 have been read via the driver 410 and stored in the RAM 402 of the CPU 401.

When an instruction from the game player as the user is entered from the manual controller 16 into the entertainment apparatus 12, the CPU 401 calculates the position of an object and the direction toward a viewpoint in a three-dimensional (3D) space. The polygon vertex data of the polygon defined as orthogonal three coordinate axes X, Y, Z are thus changed. The changed polygon vertex data are then converted into two-dimensional coordinate data by perspective transformation.

An area defined by two-dimensional coordinates is a so-called polygon. The converted two-dimensional coordinate data, the Z data, and the texture data are supplied to the graphic synthesizer 404. Based on the converted two-dimensional coordinate data and the Z data, the graphic synthesizer 404 performs a rendering process by rendering image data based on the Z data and writing (rendering) the texture data successively into the RAM 405 (frame buffer). The rendered texture data is supplied to the display monitor 18 and displayed as an image on the display screen thereof after one frame of image data completed by the rendering process is encoded by the encoder 407.

The entertainment system according to the above embodiment is basically constructed and operates as described above. Now, camera movement (camera work) patterns and special effects when a game is replayed will be described in detail below.

Figure 5:
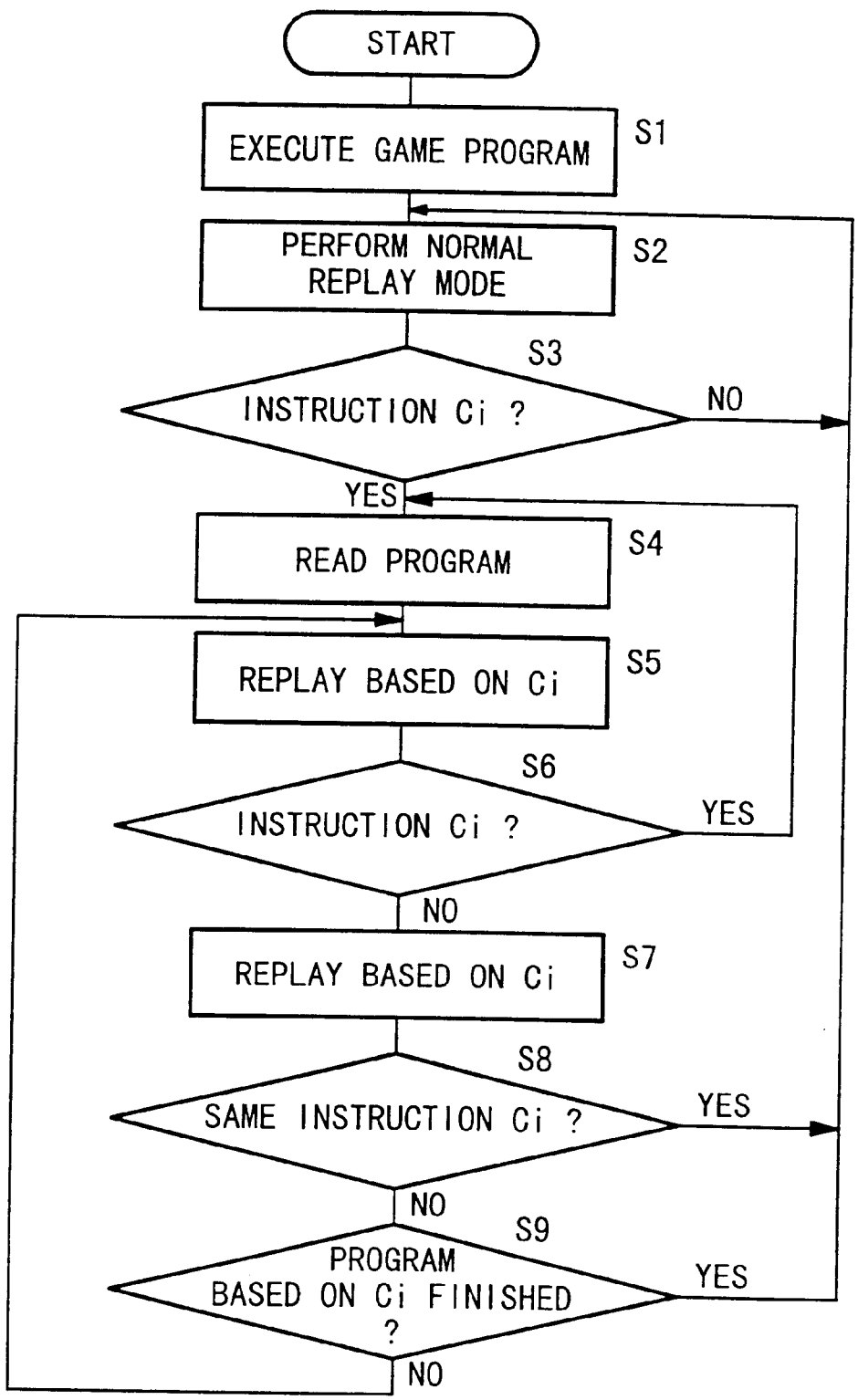
FIG. 5 is a flowchart of an operation sequence for moving the position of a camera viewpoint at the time a game is replayed.

FIG. 5 shows an operation sequence illustrative of camera work (camera movement), i.e., an operation sequence for moving the position of a camera viewpoint, at the time a game is replayed.

In step S1, the CPU 401 reads a game program (application program) recorded in the optical disk 20 loaded in the casing of the entertainment apparatus 12 by the disk tray 22, through the driver 410 and the input/output processor 409, writes a certain length of the program in the RAM 402, and then reads and executes the written program. The game represented by the game program progresses as the game player operates the manual controller 16 to send instructions.

Figure 6:
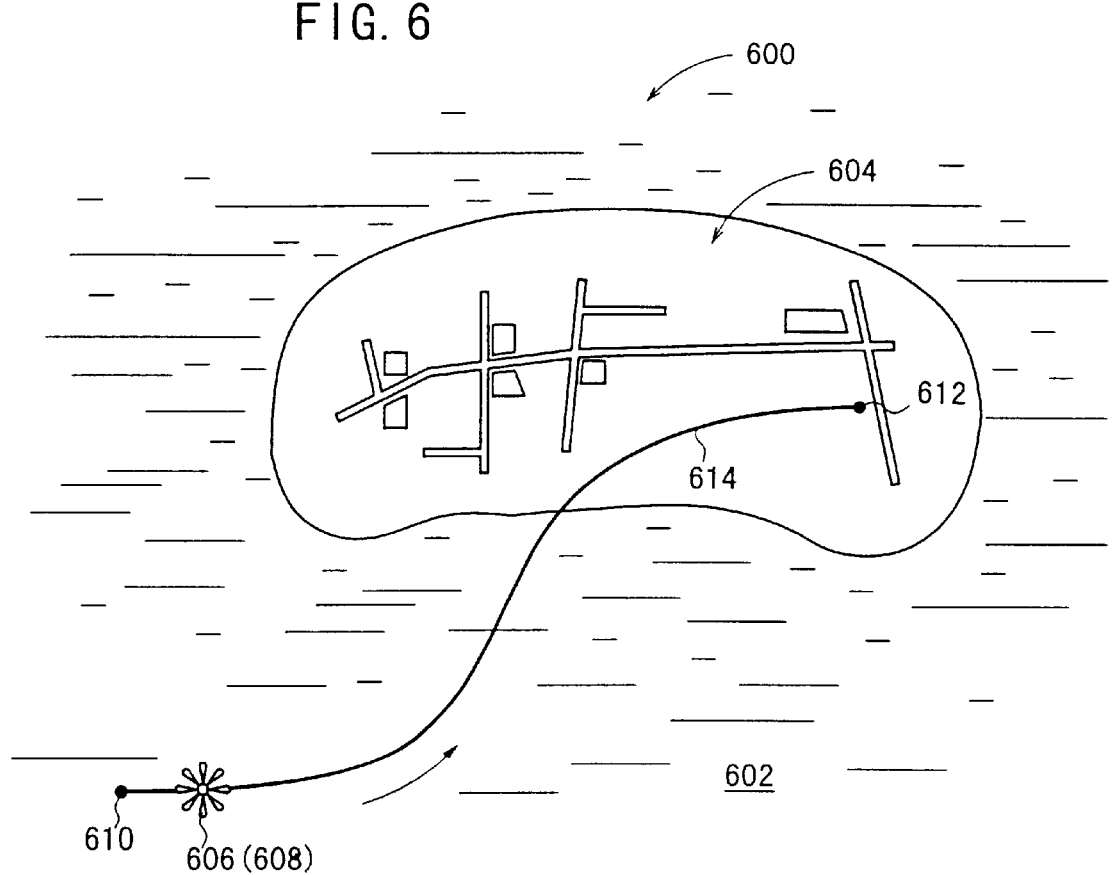
FIG. 6 is a view of a map displayed on a display screen.

FIG. 6 shows in plan a scene in which the game is carried out, as a map 600. In the scene, the game player uses the manual controller 16 to catch a firework that is launched in a city 604 at night surrounded by a sea 602, and set off and opens the firework. Fireworks are launched from the city 604 or the sea 602 either over or under the surface of the sea 602.

Figure 8:
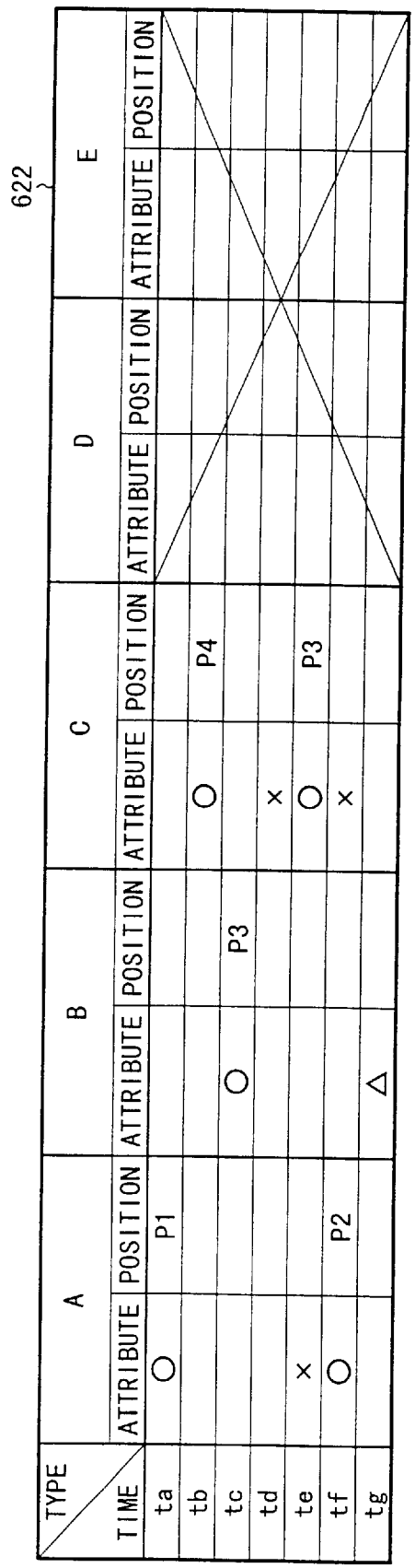
FIG. 8 is a diagram showing a firework information table which stores firework information representing fireworks that are launched, the positions and types of fireworks that are set off, etc.

Firework information representing fireworks that are launched, the positions (world coordinates) and types of fireworks that are set off during the execution of the game is recorded as a firework information table 622 shown in FIG. 8 in a certain area of the RAM 402, using elapsed times (points of time) in the stage as a key.

Specifically, as shown in FIG. 8, with respect to fireworks A–E, launch times ti=ta, tb, . . . of attribute information indicated by ○ in the firework information table 622, launch positions (shooting positions) Pi=P1, P2, . . . of positional information, and extinction times of the attribute information indicated by Δ in the firework information table 622, are recorded in the program using points of time as a key. Set-off times of the attribute information indicated by X in the firework information table 622 are successively recorded in the firework information table 622.

For example, the firework information of the fireworks A, B, C will be described below. The firework A is launched from a position P1 at a time ta, set off at a time te, and launched again from a position P2 at a time tf. The firework B is launched from a position P3 at a time tc, and becomes extinct without being set off at a time tg. The firework C is launched from a position P4 at a time tb, and set off at a time td, and launched from the position P3 at the time te, and set off at the time tf. It is possible to program to launch fireworks of the same type before becoming extinct or being set off.

As shown in FIG. 6, a hypothetical camera 608 is mounted on a hypothetical moving body 606 of a firework motif, and moves with the moving body 606 on and along a given path 614 from a start point 610 to an end point 612 at a substantially constant speed in the direction indicated by the arrow. In this manner, fireworks that are launched, become extinct, and set off in the city 604 as seen from the hypothetical camera 608 are displayed as a 3D graphics image on the display screen of the display monitor 18.

During the execution of the game, the viewpoint of the hypothetical camera 608 (hereinafter referred to as "camera viewpoint" or "camera viewpoint position") can rotate 360° in a horizontal direction on the path 614, and can look down from a position vertically above the path 614. However, the viewpoint position of the hypothetical camera 608 during the execution of the game is determined by the program, and cannot be moved as desired by the game player. The viewpoint position of the hypothetical camera 608 during the execution of the game is referred to as "normal camera viewpoint" or "normal camera viewpoint position".

Figure 7:
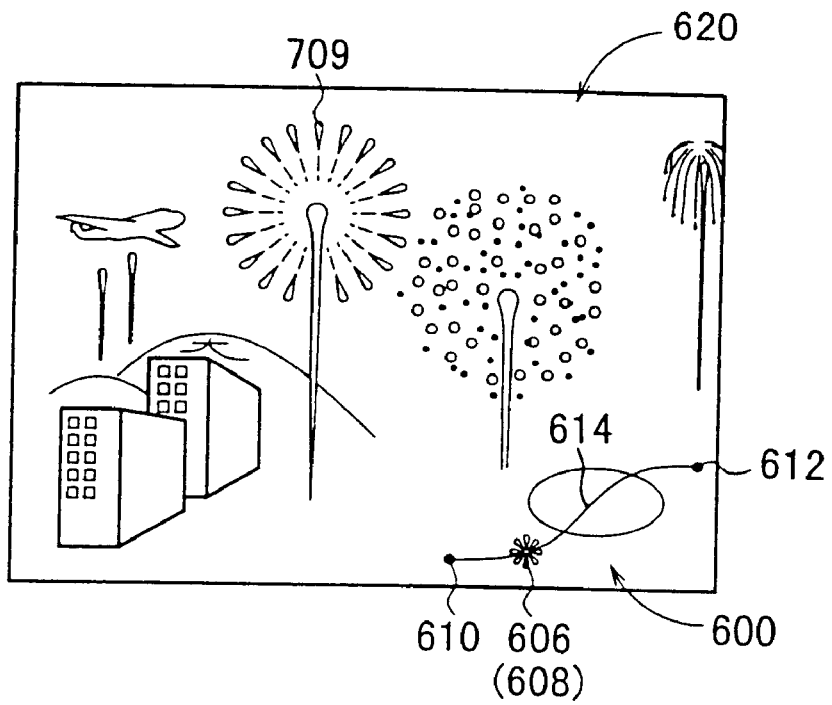
FIG. 7 is a view of a 3D graphics color image displayed the instant fireworks are launched.

FIG. 7 shows a 3D graphics color image 620 displayed the instant fireworks 618 are launched. The image 620 includes the map 600, except for the sea 602, shown in FIG. 6 in a right lower area thereof. Each time the L2 button 53b, for example, of the manual controller 16 is pressed, the map 600 is alternately displayed or not displayed.

The map 600 that is continuously displayed on the display screen allows the game player to visually confirm the position of the moving body 606 on the path 614 to determine the remaining length of one stage during the execution of one game. One stage is finished when the moving body 606 moves from the start point 610 to the end point 612. If the ratio of launched fireworks that are caught by the manual controller 16 is equal to or lower than a predetermined ratio, then one stage is finished even when it is in progress. When the game is replayed, as described later on, the position of the moving body 606 serves as the position to start moving the camera and the position to return the camera thereto.

Actually, when the game is executed or replayed, it is impossible for the CPU 401 to read three-dimensional model data (simply referred to as three-dimensional data) of world coordinates relative to objects in all scenes in the game from the optical disk 20 via the input/output processor 409 into the RAM 402. Based on the present viewpoint position of the hypothetical camera 608, i.e., the present camera viewpoint position, the data of only a certain region in the map 600, i.e., the data of only a replayable region, are successively held in the RAM 402.

Specifically, a certain area of the RAM 402 is used as an FIFO memory area, and when a certain amount of new three-dimensional data is written in the FIFO memory area, the same amount of old three-dimensional data is erased from the FIFO memory area, so that a constant amount of three-dimensional data is held in the RAM 402 at all times.

Three-dimensional data include wire frame data of models, coordinates of polygon vertexes of wire frames, colors of polygon vertexes, and orientations of polygons.

After the game program has been executed in step S1, a selection image for selecting a replay of the game is displayed. If the game player selects a replay of the game with the manual controller 16, then the game is automatically replayed with the above normal camera viewpoint in step S2, and the image 620 shown in FIG. 7, for example, is displayed. The mode in which the game is automatically replayed with the normal camera viewpoint is referred to as "normal replay mode".

Specifically, the CPU 401 refers to the replayable region and the firework information table 622 in the RAM 402 and successively generates a display list of certain length with the normal camera viewpoint in the RAM 402. Based on the display list, the graphic synthesizer 404 generates two-dimensional image data, processed by perspective transformation, from the three-dimensional data stored in the RAM 402, and supplies the two-dimensional image data to the encoder 407, which supplies an image signal to the display monitor 18 to display a corresponding image thereon.

While the game is being automatically replayed, the CPU 401 monitors whether a control input is generated by a control button 102 that is assigned to the generation of a camera motion or not in step S3. Specifically, the CPU 401 monitors whether or not there is an instruction Ci produced by a control input (key input) from either one of the direction keys 51a, 51b, 51c, 51d of the first control unit 51 or the control buttons 52a, 52b, 52c, 52d of the second control unit 52.

If there is no instruction Ci, then the normal replay mode in step S2 is repeated until the normal replay mode is put to an end.

If there is an instruction Ci (Ci=C1) produced by a control input from either one of the direction keys 51a, 51b, 51c, 51d of the first control unit 51 or the control buttons 52a, 52b, 52c, 52d of the second control unit 52, then the CPU 401 reads a camera motion generating program corresponding to the pressed one of the direction keys 51a, 51b, 51c, 51d and the control buttons 52a, 52b, 52c, 52d from the RAM 402 in step S4.

In step S5, the CPU 401 executes the camera motion generating program which has been read from the RAM 402 in response to the instruction Ci=C1. The viewpoint of the hypothetical camera 608 is now moved on a given path in the replayable region based on the camera motion generating program according to the instruction Ci=C1.

Details of camera motion generating programs which correspond to the direction keys 51a, 51b, 51c, 51d and the control buttons 52a, 51b, 52c, 52d will be described below.

Figure 9:
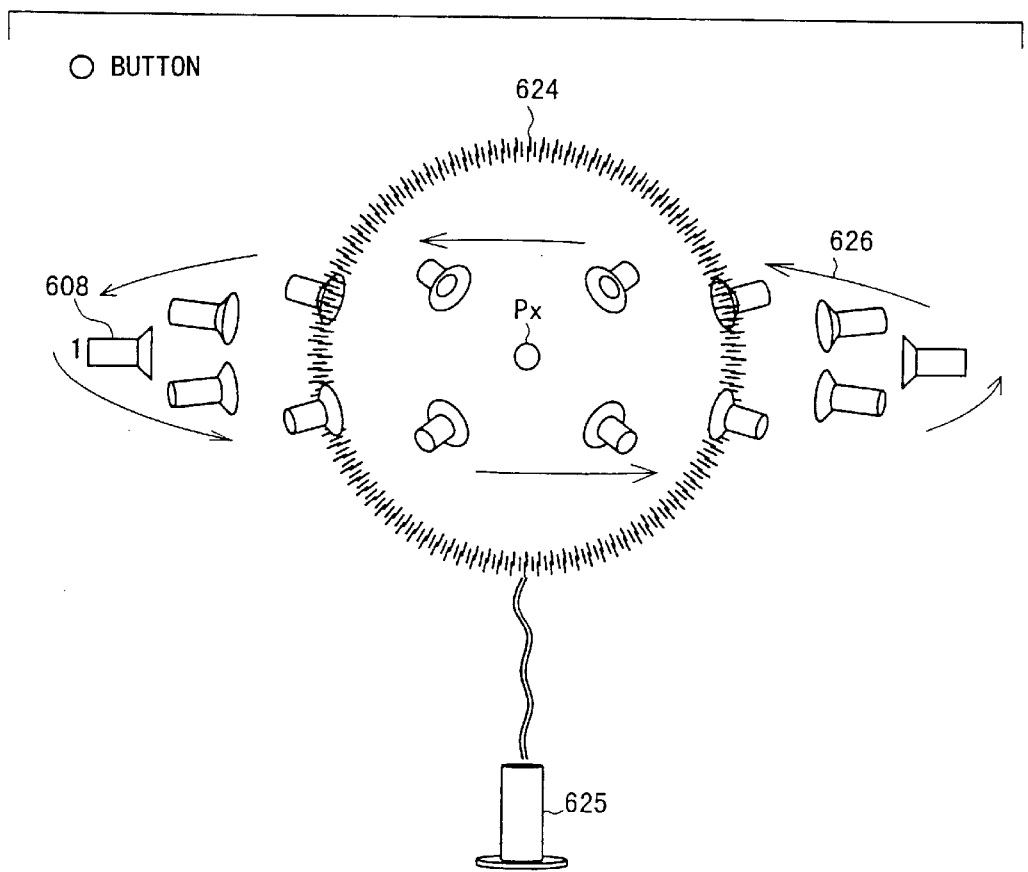
FIG. 9 is a view showing a first camera work pattern for moving the position of the viewpoint of a hypothetical camera along a predetermined track in response to a command entered when a game is replayed.

FIG. 9 schematically shows a first camera work pattern of the hypothetical camera 608 based on the camera motion generating program which is activated when the ○ button 52b is pressed.

According to the first camera work pattern, the hypothetical camera 608 moves along a path 626 from a present camera viewpoint position 1 as a start point toward a shooting position Px where a firework 624 is set off, while rotating counterclockwise as seen from the camera viewpoint position 1, and then away from the shooting position Px while in rotation back to the present camera viewpoint position 1, which also serves as an end point.

The firework 624 is launched from a firework barrel 625, set off in the shooting position Px, and spread radially from the shooting position Px. While moving along the path 626, the hypothetical camera 608 is always directed toward the shooting position Px. Actually, because the moving body 606 is moving, the present camera viewpoint position 1 as the end point is spaced from the present camera viewpoint position 1 as the start point by the time that has elapsed upon the movement of the moving body 606. It is possible to replay the game while the moving body 606 is being held at rest. In this case, the present camera viewpoint position 1 as the end point is the same as the present camera viewpoint position 1 as the start point.

Figure 10:
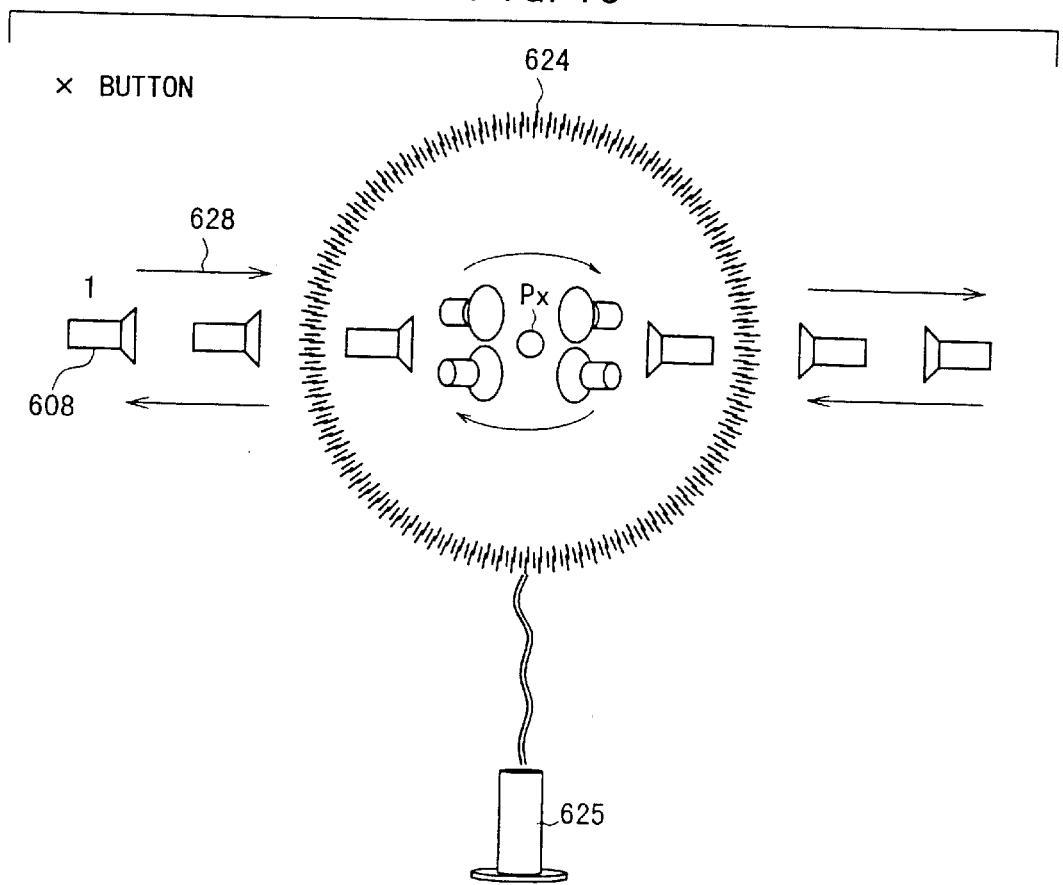
FIG. 10 is a view showing a second camera work pattern.

FIG. 10 schematically shows a second camera work pattern of the hypothetical camera 608 based on the camera motion generating program which is activated when the X button 52c is pressed.

According to the second camera work pattern, the hypothetical camera 608 moves straight from the camera viewpoint position 1 toward the shooting position Px. After having passed through the shooting position Px, the hypothetical camera 608 swings horizontally 180° clockwise as seen from the camera viewpoint position 1. Thereafter, the hypothetical camera 608 moves back while swinging horizontally 90° clockwise as seen from the camera viewpoint position 1, and then moves toward the shooting position Px. Then, the hypothetical camera 608 moves back to the camera viewpoint tion 1 as the end point while further swinging horizontally 90° clockwise as seen from the camera viewpoint position 1. The hypothetical camera 608 is always directed toward the shooting position Px.

Figure 11:
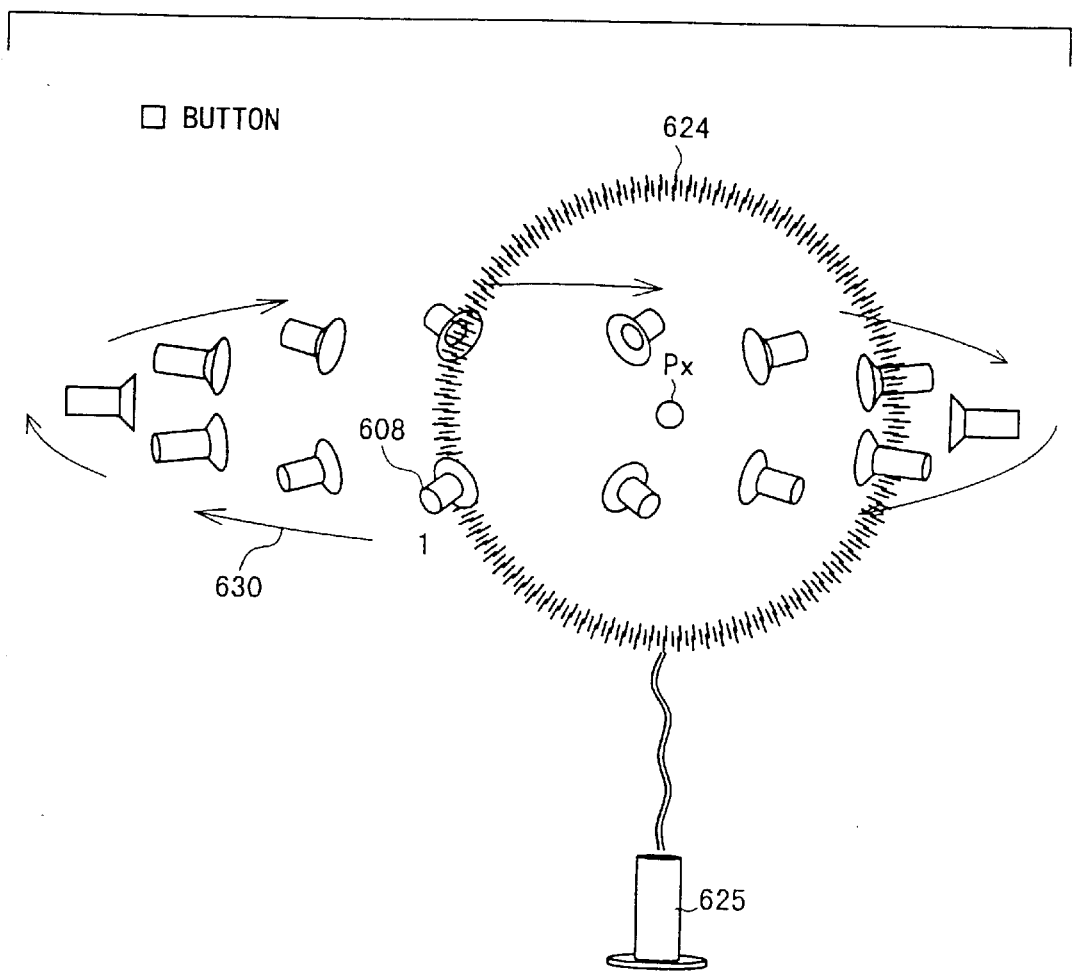
FIG. 11 is a view showing a third camera work pattern.

FIG. 11 schematically shows a third camera work pattern of the hypothetical camera 608 based on the camera motion generating program which is activated when the □ button 52d is pressed.

According to the third camera work pattern, the hypothetical camera 608 moves along a path 630 from the camera viewpoint position 1 away from the shooting position Px while rotating clockwise as seen from the camera viewpoint position 1, and then back to the present camera viewpoint position 1 as the end point while approaching the shooting position Px in rotation. The hypothetical camera 608 is always directed toward the shooting position Px.

Figure 12:
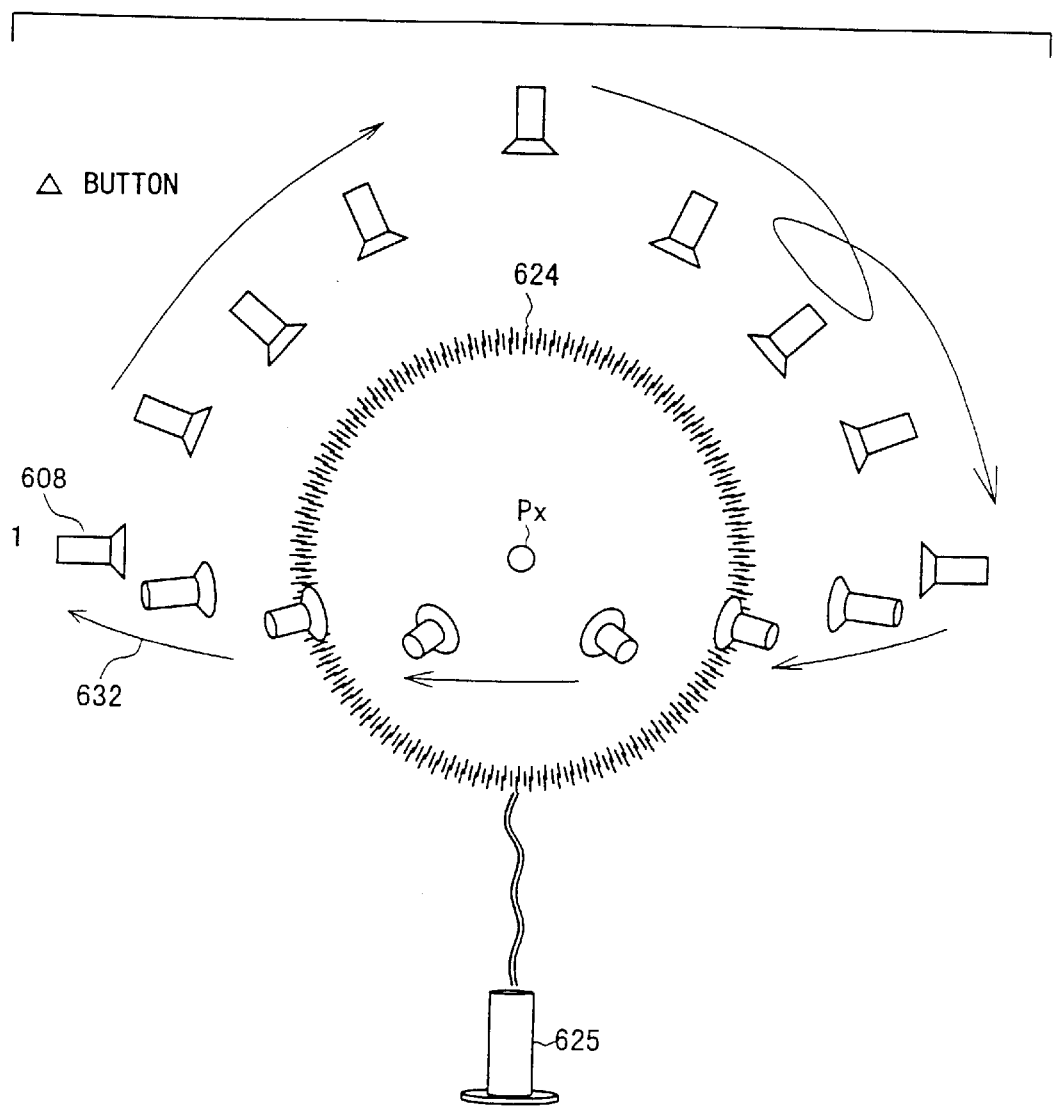
FIG. 12 is a view showing a fourth camera work pattern.

FIG. 12 schematically shows a fourth camera work pattern of the hypothetical camera 608 based on the camera motion generating program which is activated when the A button 52a is pressed.

According to the fourth camera work pattern, the hypothetical camera 608 moves along a path 632 from the camera viewpoint position 1 up to a position directly above the shooting position Px and then down to a position which is in point symmetry relation to the camera viewpoint position 1 with respect to the shooting position Px, while falling in a spin, and thereafter back to the present camera viewpoint position 1 as the end point while turning horizontally 180° clockwise. The hypothetical camera 608 is always directed toward the shooting position Px.

Figure 13:
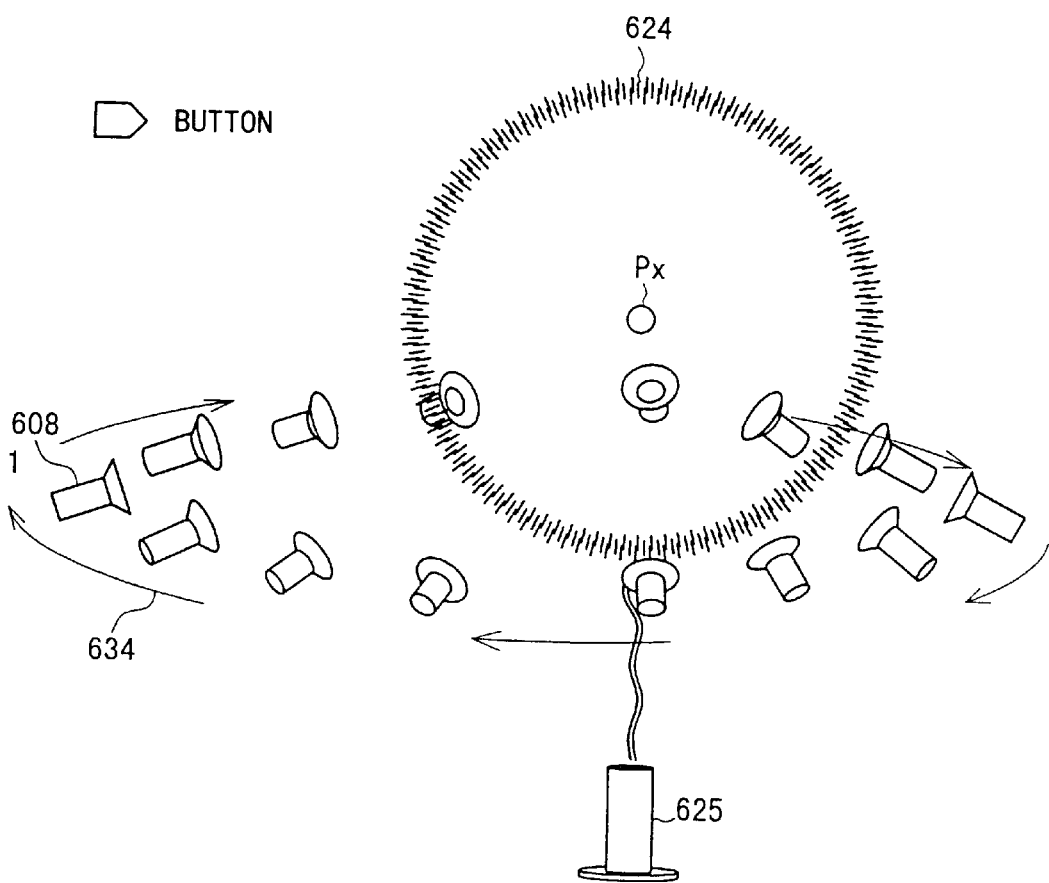
FIG. 13 is a view showing a fifth camera work pattern.

FIG. 13 schematically shows a fifth camera work pattern of the hypothetical camera 608 based on the camera motion generating program which is activated when the left direction key 51c is pressed.

According to the fifth camera work pattern, the hypothetical camera 608 moves along a path 634 from the camera viewpoint position 1 toward the shooting position Px at such an angle as to look up to the shooting position Px while rotating clockwise as seen from the camera viewpoint position 1, and then away from the shooting position Px while in rotation back to the present camera viewpoint position 1 as the end point. The hypothetical camera 608 is always directed toward the shooting position Px.

Figure 14:
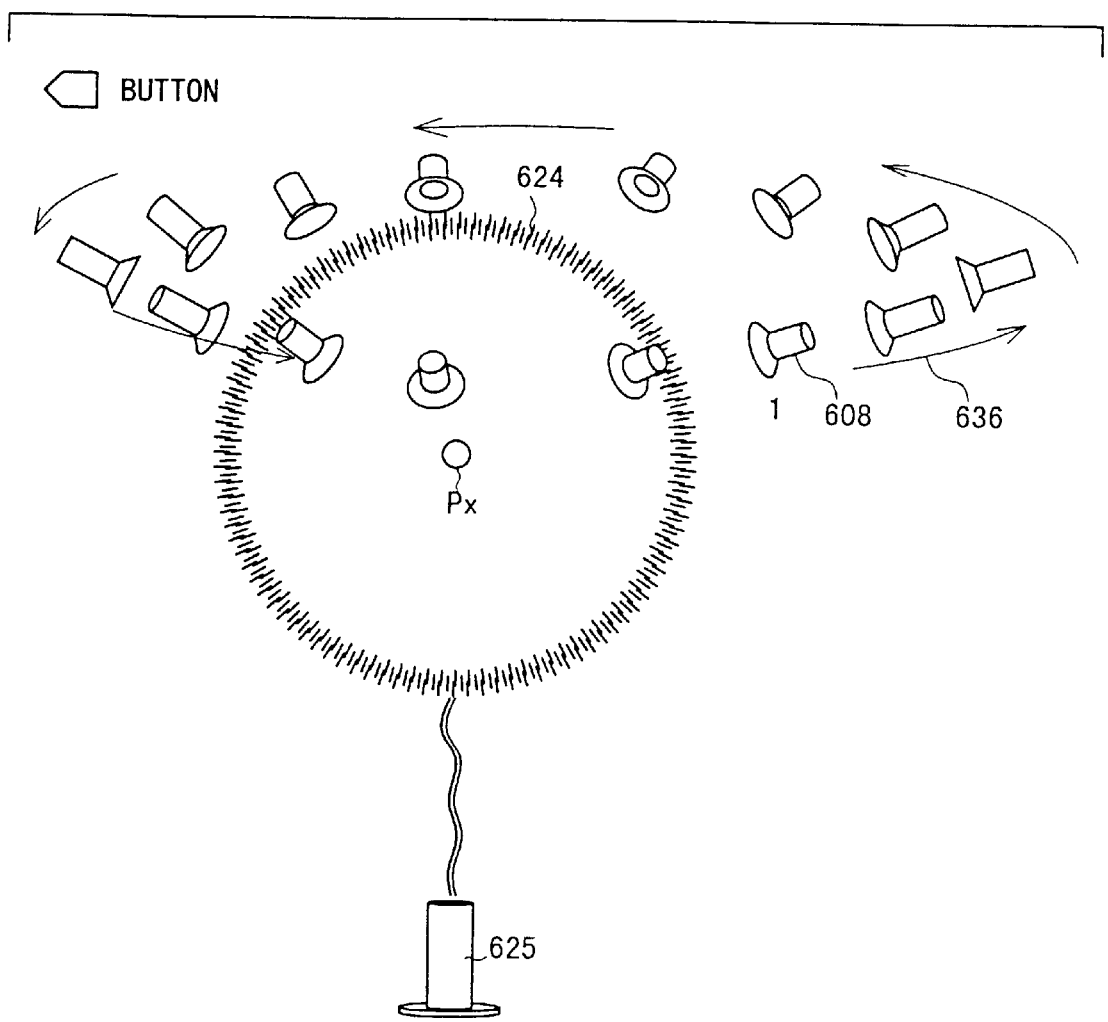
FIG. 14 is a view showing a sixth camera work pattern.

FIG. 14 schematically shows a sixth camera work pattern of the hypothetical camera 608 based on the camera motion generating program which is activated when the right direction key 51d is pressed.

According to the sixth camera work pattern, the hypothetical camera 608 moves along a path 636 from the camera viewpoint position 1 away from the shooting position Px at such an angle as to look down to the shooting position Px while rotating counterclockwise as seen from the camera viewpoint position 1, and then toward the shooting position Px while in rotation back to the present camera viewpoint position 1 as the end point. The hypothetical camera 608 is always directed toward the shooting position Px.

Figure 15:
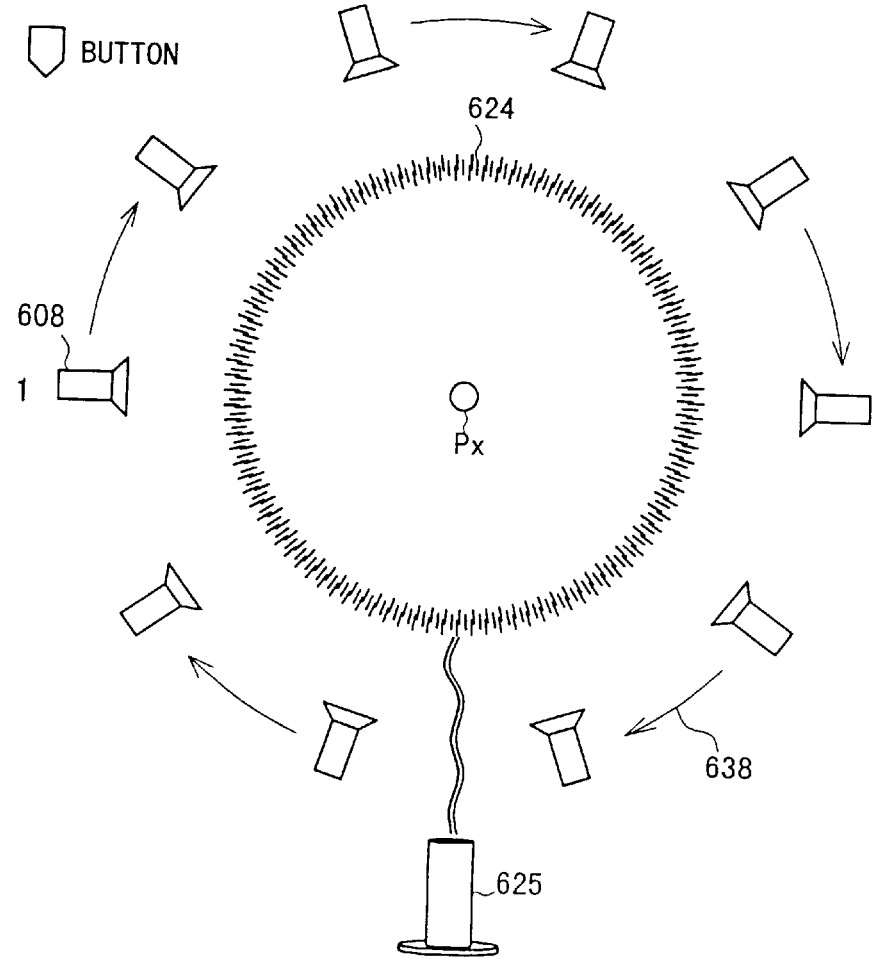
FIG. 15 is a view showing a seventh camera work pattern.

FIG. 15 schematically shows a seventh camera work pattern of the hypothetical camera 608 based on the camera motion generating program which is activated when the upward direction key 51a is pressed.

According to the seventh camera work pattern, the hypothetical camera 608 moves along a path 638 vertically from the camera viewpoint position 1 while rotating 360° and back to the present camera viewpoint position 1 as the end point. The hypothetical camera 608 is always directed toward the shooting position Px.

Figure 16:
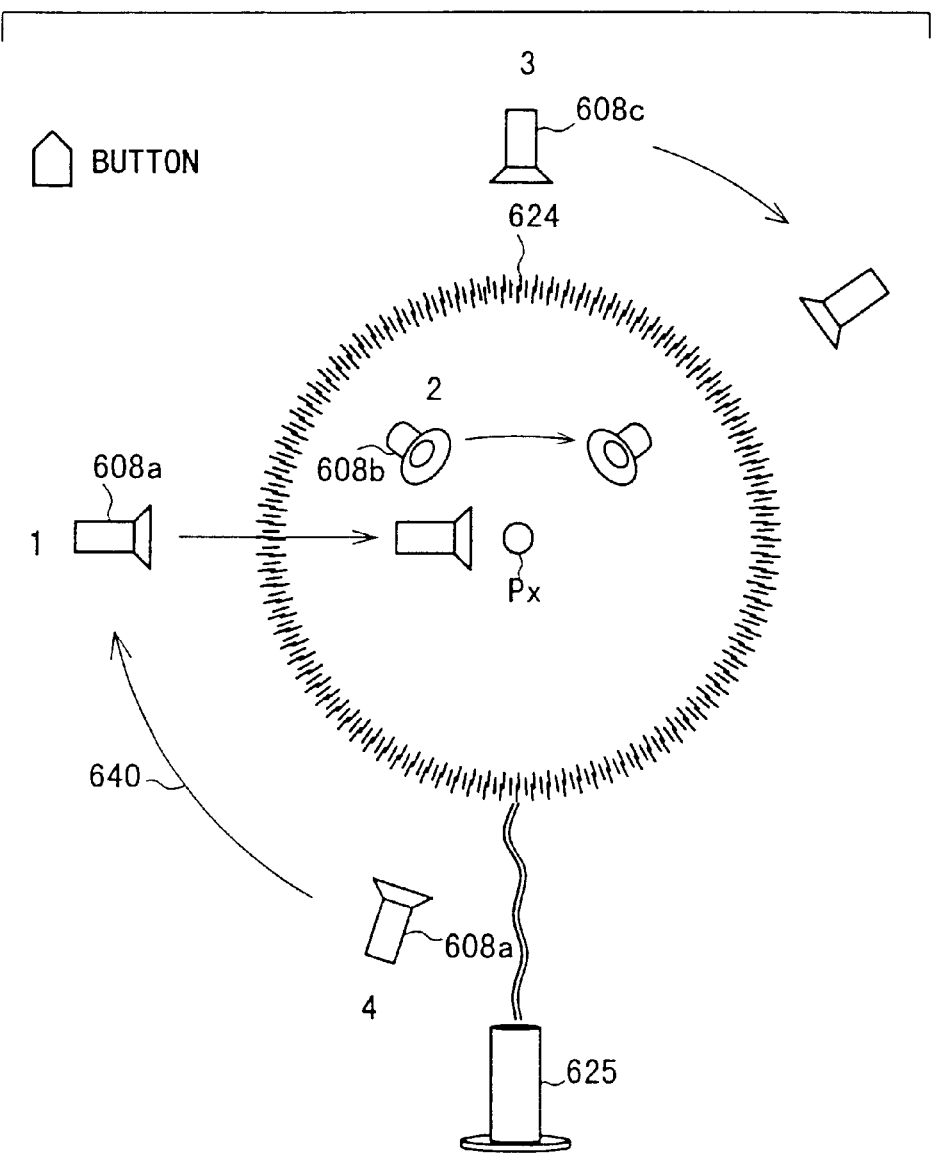
FIG. 16 is a view showing an eighth camera work pattern.

FIG. 16 schematically shows an eighth camera work pattern of the hypothetical camera 608 based on the camera motion generating program which is activated when the downward direction key 51b is pressed.

According to the eighth camera work pattern, the hypothetical camera 608 comprises a plurality of hypothetical cameras 608a, 608b, 608c. The hypothetical camera 608a moves from the camera viewpoint position 1 straight toward the shooting position Px by a certain distance. Thereafter, the hypothetical camera 608a switches to the hypothetical camera 608b at a position 2, and the hypothetical camera 608b, which is directed horizontally, rotates clockwise. After having moved a certain distance, the hypothetical camera 608b switches to the hypothetical camera 608c at a position 3, the hypothetical camera 608c looking down to the shooting position Px. After having moved a certain distance, the hypothetical camera 608c switches to the hypothetical camera 608a which looks up to the shooting position Px. The hypothetical camera 608a then moves along a path 604 back to the present camera viewpoint position 1 as the end point. The hypothetical cameras 608a, 608b, 608c are always directed toward the shooting position Px.

In step S6 shown in FIG. 5, while the hypothetical camera 608 is moving according to the camera work pattern based on the camera motion generating program executed in step S5, the CPU 401 monitors whether a control input is generated by another control button 102 that is assigned to the movement of a camera or not. Specifically, the CPU 401 monitors whether or not there is an instruction Ci (=C2) produced by a control input (key input) from either one of the direction keys 51a, 51b, 51c, 51d or the control buttons 52a, 52b, 52c, 52d, other than the instruction Ci (=C1) entered in step S3.

If there is a new instruction Ci (=C2), then the CPU 401 cancels the camera motion generating program executed based on the present instruction Ci (=C1), and reads a camera motion generating program corresponding to the new instruction Ci (=C2) from the RAM 402. The CPU 401 then executes the read camera motion generating program corresponding to the new instruction Ci (=C2) in step S5. The camera viewpoint position 1 is now shifted to another one of the paths shown in FIGS. 9 through 16.

If there is no new instruction Ci (=C2) in step S6, then the CPU 401 continues the motion of the camera viewpoint position 1 on the path based on the camera motion generating program which corresponds to the instruction Ci (=C1) in step S7.

In step S8, when the motion of the camera viewpoint position 1 is continued on the path based on the camera motion generating program read in step S4, the CPU 401 determines whether or not there is an instruction from the same control button 102 as the control button 102 which has entered the instruction Ci in step S4. If there is such an instruction Ci, then the CPU 401 cancels the camera motion generating program executed based on the present instruction Ci. Control then goes back to step S2 to perform the normal replay mode with the normal camera viewpoint position. For example, if the present instruction Ci from a certain control button 102 is Ci=C1 and an instruction Ci=C1 is entered from the same control button 102, then the CPU 401 cancels the presently executed camera motion generating program, and performs the normal replay mode with the normal camera viewpoint position.

If there is not entered an instruction Ci from the same control button 102 in step S8, then the CPU 401 determines whether the motion of the camera viewpoint position based on the camera motion generating program read in step S4 is finished or not in step S9. If not finished, then control goes back to step S5 to continue replaying the game according to the camera motion generating program. If finished, then control goes back to step S2 to perform the normal replay mode with the normal camera viewpoint position.

The normal replay mode in step S2 is finished when the motion of the moving body 606 along the path 614 from the start point 610 to the end point 612 is finished if that stage is cleared. If the stage is not cleared, then the normal replay mode in step S2 is finished when the moving body 606 arrives at a gameover point.

Special effects that can be introduced while the game is being replayed will be described in detail below. Producing a special effect means processing, i.e., changing an image that is being re-displayed. An image can be processed or changed in the normal replay mode with no camera motion or while the game is being replayed with a camera motion. Stated otherwise, the CPU 401 concurrently executes the processing in steps S2–S9 shown in FIG. 5 and the processing in steps S12–S23 shown in FIG. 17. Changes in images include changes other than special effects.

Figure 17:
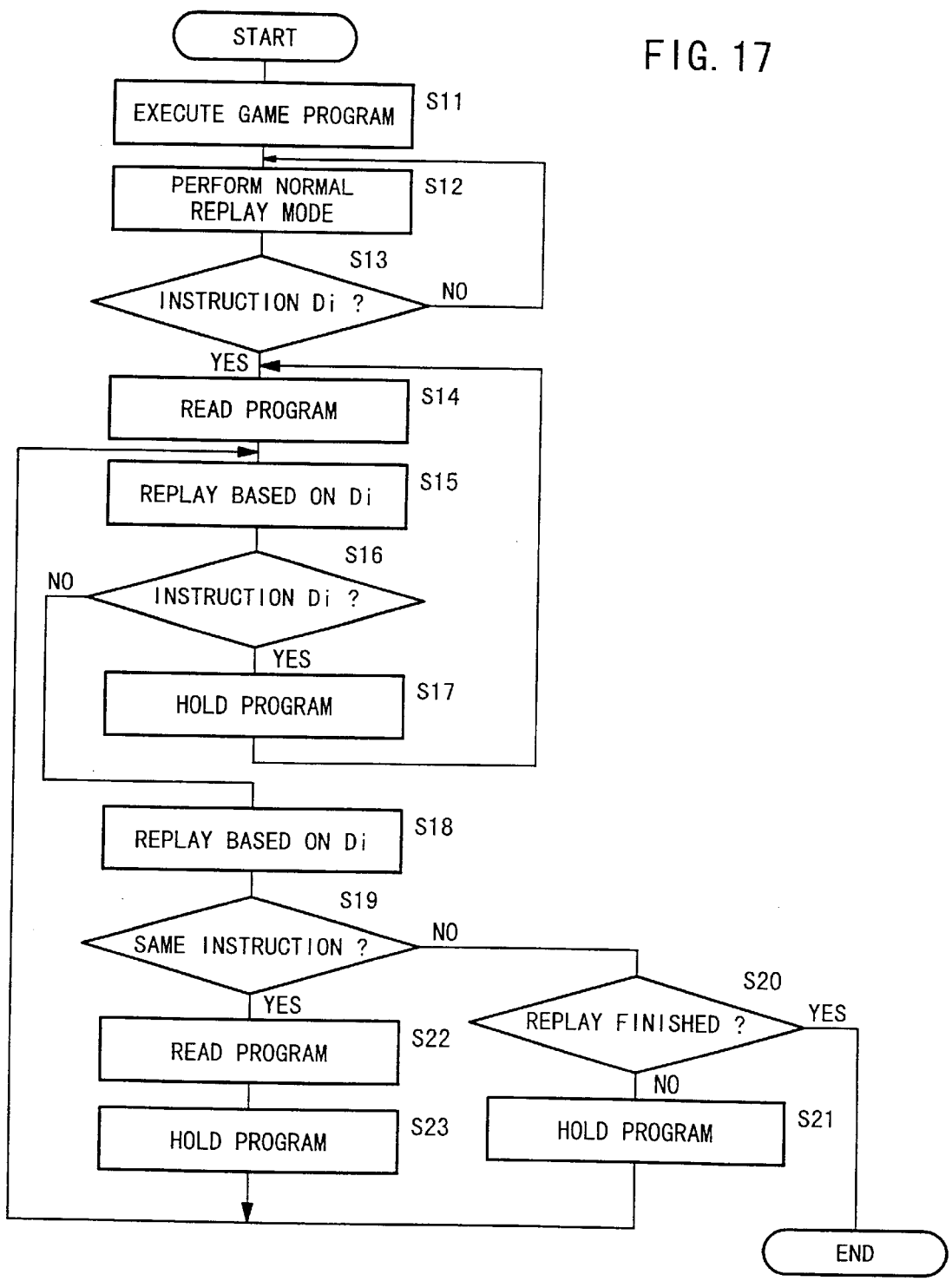
FIG. 17 is a flowchart of an operation sequence for producing a special effect when a game is replayed.

FIG. 17 shows an operation sequence for producing a special effect when a game is replayed.

In step S11, the CPU 401 executes a game program. Details of step S11 are the same as those of step S1 shown in FIG. 5, and will not be described below.

After the game program has been executed in step S1, a selection image for selecting a replay of the game is displayed. If the game player selects a replay of the game with the manual controller 16, then the game is automatically replayed with the above normal camera viewpoint in the normal replay mode in step S12, and the image 620 shown in FIG. 7, for example, is displayed.

Specifically, the CPU 401 refers to the replayable region and the firework information table 622 and successively generates a display list of certain length with the normal camera viewpoint in the RAM 402. Based on the display list, the graphic synthesizer 404 generates two-dimensional image data processed by perspective transformation, and supplies the two-dimensional image data to the encoder 407, which supplies an image signal to the display monitor 18 to display a corresponding image thereon.

While the game is being automatically replayed, the CPU 401 monitors whether a control input is generated by a control button 102 that is assigned to the generation of a change in an image or not in step S13. Specifically, the CPU 401 monitors whether or not there is an instruction Di produced by a control input (key input) from either one of the control buttons (L1, L2 buttons) 53a, 53b of the third control unit 53 and the control buttons (R1, R2 buttons) 54a, 54b of the fourth control unit 54.

If there is no instruction Di, then the normal replay mode in step S12 is repeated until the normal replay mode is put to an end.

If there is an instruction Di (Di=D1) produced by a control input from either one of the L1, L2 buttons 53a, 53b and the R1, R2 buttons 54a, 54b, then the CPU 401 reads an image change generating program corresponding to the pressed one of the L1, L2 buttons 53a, 53b and the R1, R2 buttons 54a, 54b in step S14.

In step S15, the CPU 401 executes the image change generating program which has been read in response to the instruction Di=D1.

Details of image change generating programs corresponding to the L1, L2 buttons 53a, 53b and the R1, R2 buttons 54a, 54b will be described below.

An image change caused in response to a control input from the R1 button 54a will first be described below.

The default setting, i.e., a setting where no value is specified, is a normal state free of any image changes. Each time the R1 button 54a is pressed once, a displayed image changes successively through image patterns (1)-(8) shown below. From the image pattern (8), the displayed image returns to the normal state.

Figure 18:
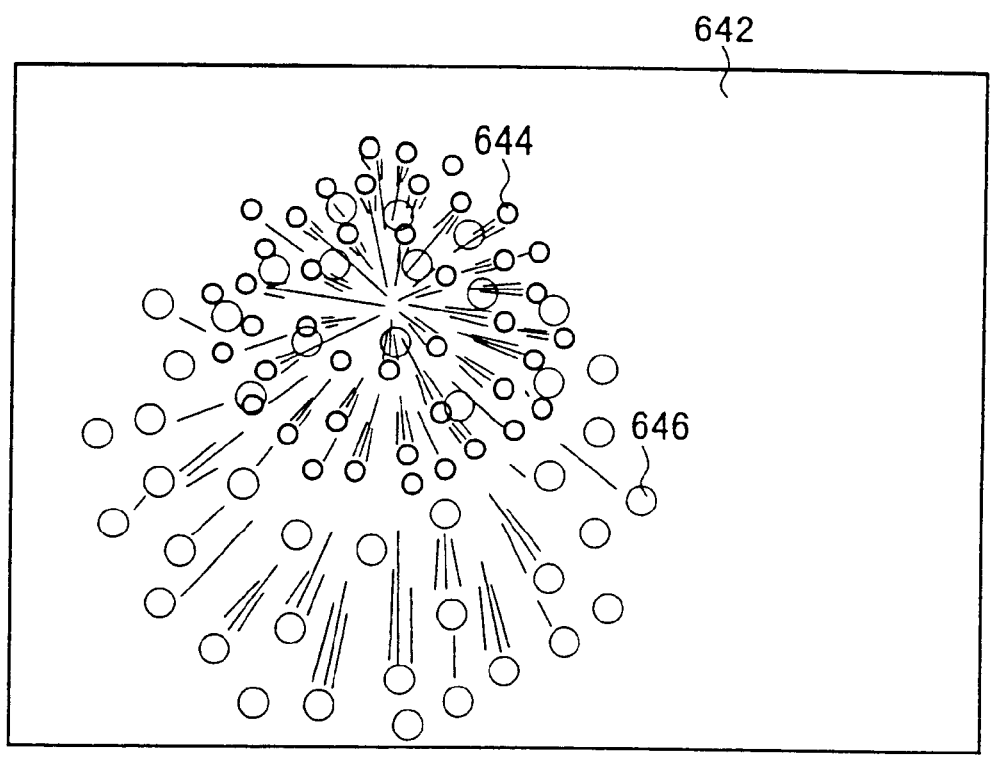
FIG. 18 is a view of an image combined with a special effect referred to as an overlapping process.

(1) FIG. 18 shows an image 642 displayed on the display monitor 18 in combination with a special effect referred to as an overlapping process when the R1 button 54a is pressed once.

As can be seen from the image 642, each time a firework 644 is set off, a firework 646 which is an enlarged image of the firework 644 is displayed in front of the firework 644 on the display screen.

The overlapping process is carried out as follows: As shown in FIG. 19A, an area 702 of an image 700 of a preceding frame recorded in the frame buffer in the RAM 405 is copied to a buffer, i.e., a given area in the RAM 405. The image copied to the buffer is interpolated and enlarged into an image 703, which is semitransparently added to an image 704 in the frame buffer where buildings and fireworks have been rendered in the present frame, as shown in FIG. 19B. FIG. 19C shows an image 706 rendered by the above overlapping process.

Figure 20:
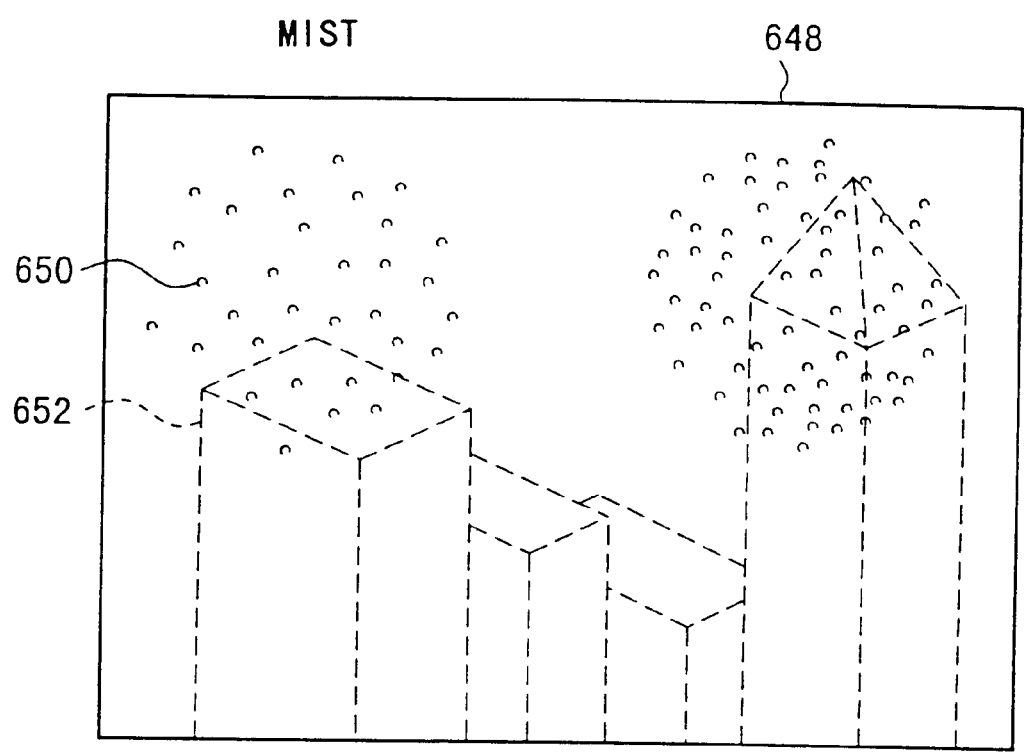
FIG. 20 is a view of an image combined with a special effect referred to as a misting process.

(2) FIG. 20 shows an image 648 displayed on the display monitor 18 in combination with a special effect referred to as a misting process when the R1 button 54a is pressed twice.

As can be seen from the image 648, the entire image is misted, displaying fireworks 650 and buildings 652 that are slightly blurred.

The misting process is carried out as follows: FIG. 21A shows an original image 710 including buildings 708 and a firework 709. A bluish image 714 with thin clouds 712 as shown in FIG. 21B is rendered in superposed relation to the original image 710, thus producing a foggy image 716 as shown in FIG. 21C.

Figure 22:
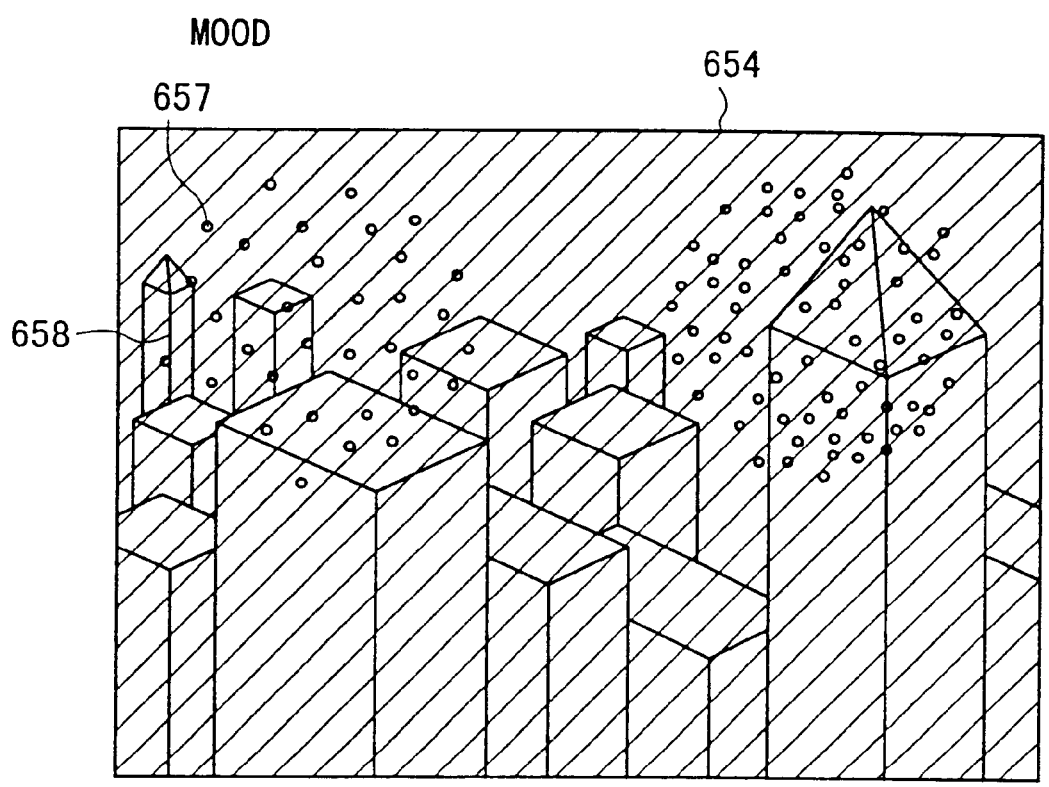
FIG. 22 is a view of an image combined with a special effect referred to as a mood creating process.

(3) FIG. 22 shows an image 654 displayed on the display monitor 18 in combination with a special effect referred to as a mood creating process when the R1 button 54a is pressed three times.

As can be seen from the image 654, the brightness of the entire image is lowered, actually displaying fireworks 656 and buildings 658 with a slightly reddish tint.

In the mood creating process, a red element is made stronger than other color elements in all pixels that make up the image. For example, color elements R (red)=200, G (green)=200, and B (blue)=200 of a pixel are multiplied by respective coefficients 1.0, 0.5, and 0.5, thus producing a pixel having color elements R=200, G=100, and B=100. By thus processing the entire pixels, an image is generated according to the mood creating process.

Figure 23:
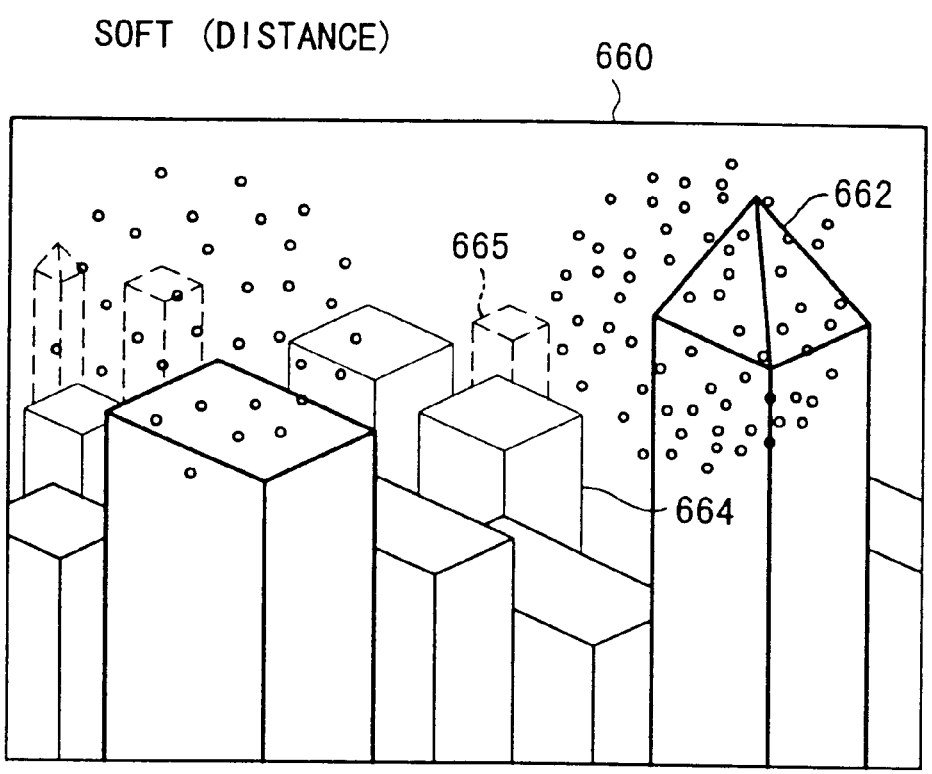
FIG. 23 is a view of an image combined with a special effect referred to as a softening process.

(4) FIG. 23 shows an image 660 displayed on the display monitor 18 in combination with a special effect referred to as a softening (distance) process when the R1 button 54a is pressed four times.

As can be seen from the image 660, the image is blurred progressively depending on the distance from the hypothetical camera 608. In the image 660, buildings 662 drawn with thick solid lines are positioned in the foreground, buildings 664 drawn with thin solid lines are positioned behind the buildings 662, and buildings 665 drawn with dotted lines are positioned in the deepest layer.

Figure 24A:
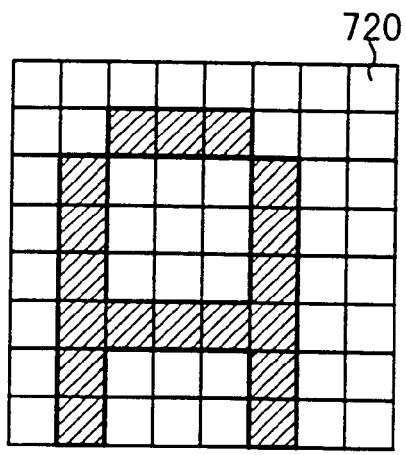
FIGS. 24A through 24C are views showing the principles of the softening process.
Figure 24B:
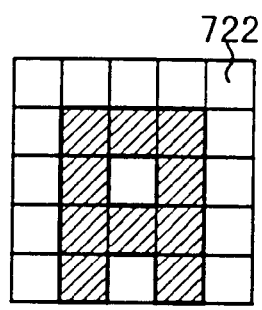
Figure 24C:
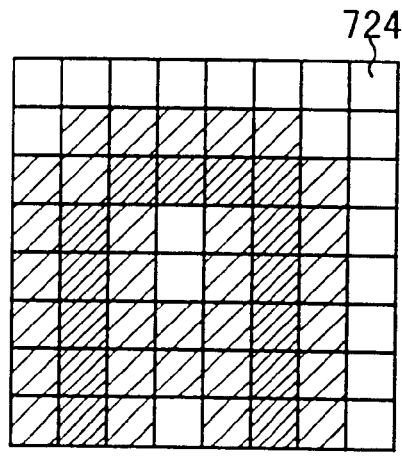

In the softening (distance) process, as shown in FIGS. 24A through 24C, an image 720 is compressed to an image 722, and a blurred image 724 is generated by interpolating and enlarging the compressed image 722 and surrounding images. Polygons onto which the blurred image is mapped as a texture are positioned successively toward the deepest layer with their transparency levels being lowered, for example, to 25%, 50%, 100%, at spaced intervals from the camera viewpoint position, thus generating an image in which objects remoter from the camera viewpoint position are blurred.

Figure 25:
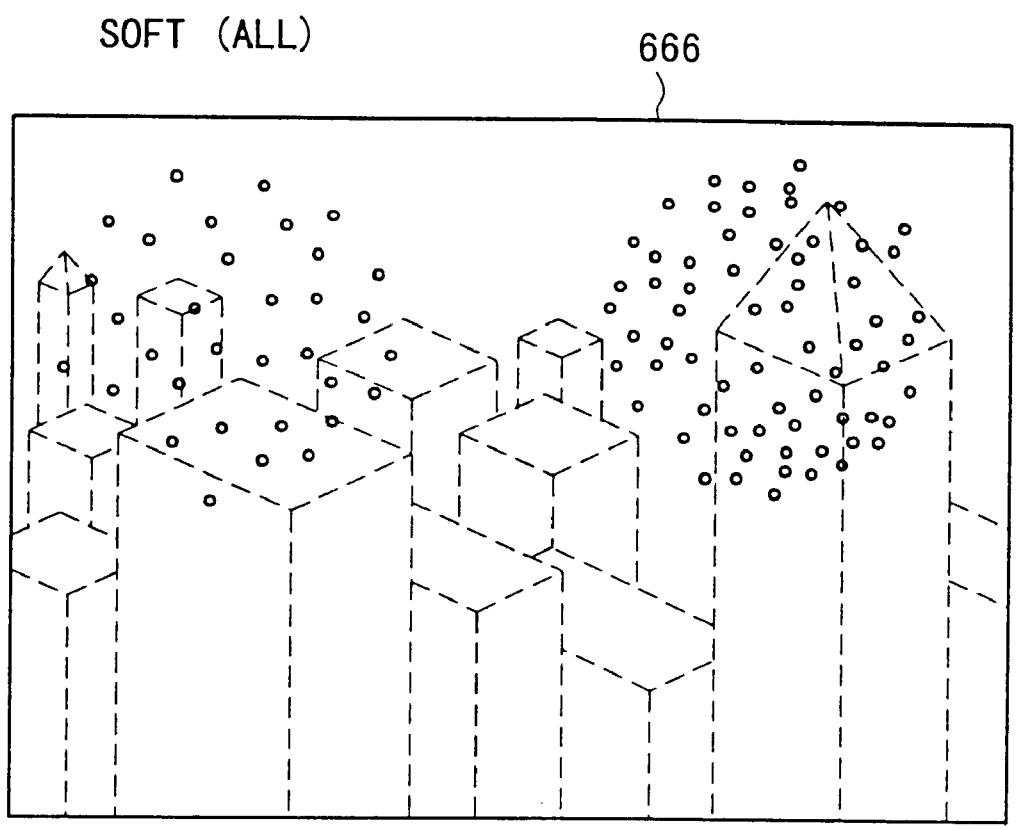
FIG. 25 is a view of an image combined with a special effect as another softening process.

(5) FIG. 25 shows an image 666 displayed on the display monitor 18 in combination with a special effect referred to as a softening (all) process when the R1 button 54a is pressed five times.

In the softening (all) process, the image 666 can be generated by interpolating and enlarging once the compressed image 722 shown in FIG. 24B.

Figure 26:
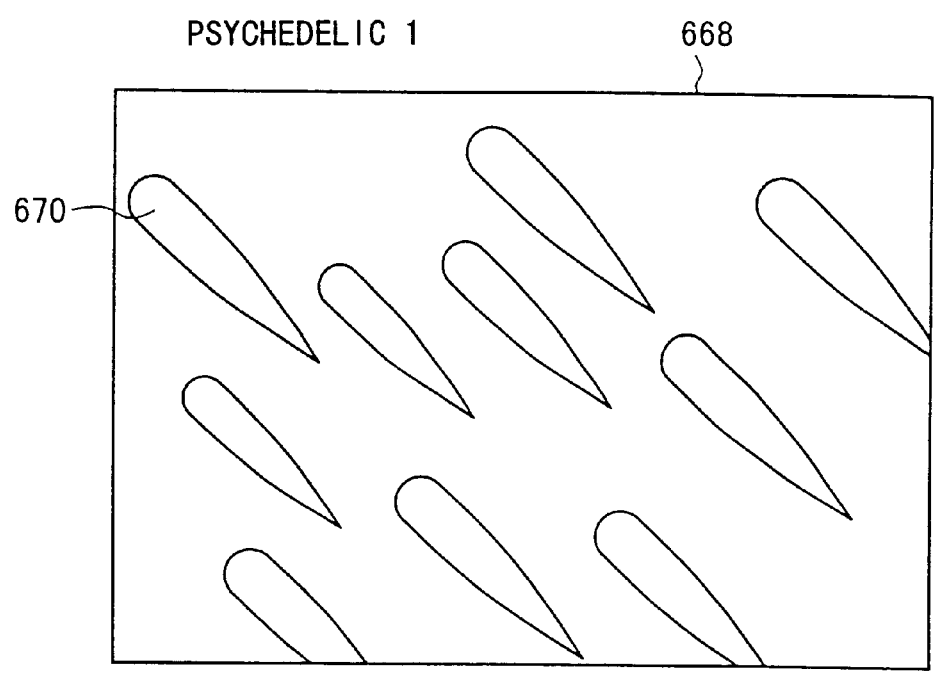
FIG. 26 is a view of an image combined with a special effect referred to as a psychedelic process.

(6) FIG. 26 shows an image 668 combined with a special effect referred to as a psychedelic process 1 when the R1 button 54a is pressed six times.

As can be seen from the image 668, any background items such as buildings are erased, and after images directed from the upper left toward the lower right are displayed on characters or fireworks 670 on the display screen.

Figure 27A:
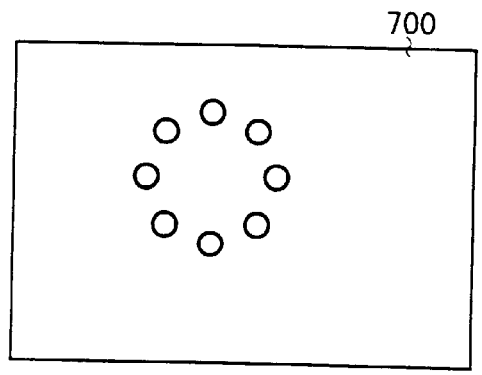
FIGS. 27A through 27D are views showing the principles of the psychedelic process.
Figure 27B:
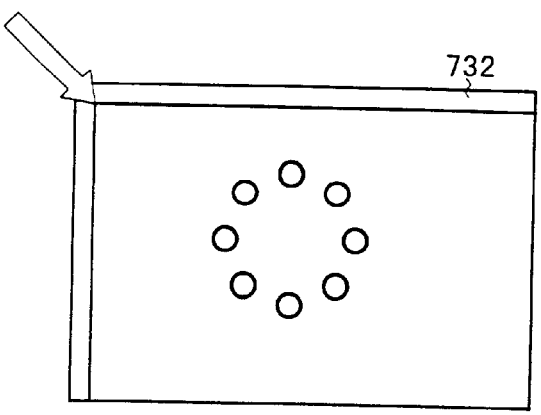
Figure 27C:
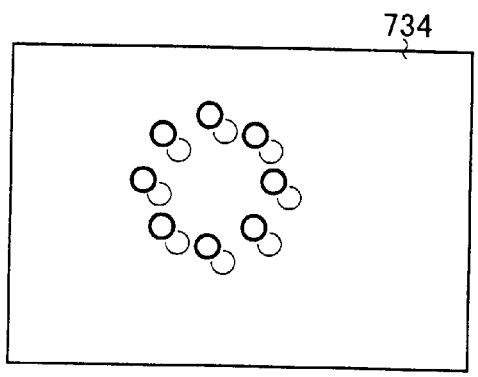
Figure 27D:
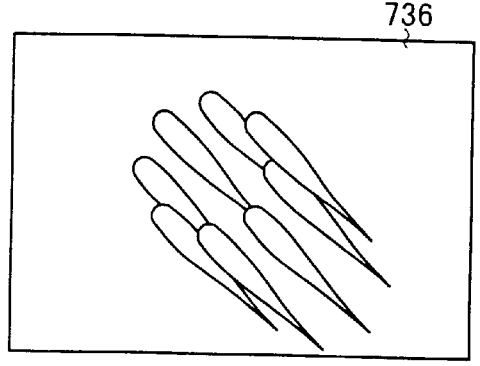

The psychedelic process 1 is carried out as follows: An image 730 in a preceding frame shown in FIG. 27A is shifted several pixels to the lower right, thus producing an image 732 shown in FIG. 27B. Then, as shown in FIG. 27c, the image 732 is rendered on the present image in a non-transparent manner, i.e., without clearing the image in the preceding frame, thus producing an image 734. Then, the operation from FIG. 27A is repeated several times to produce an image 736 with an after-image effect shown in FIG. 27D.

Figure 28:
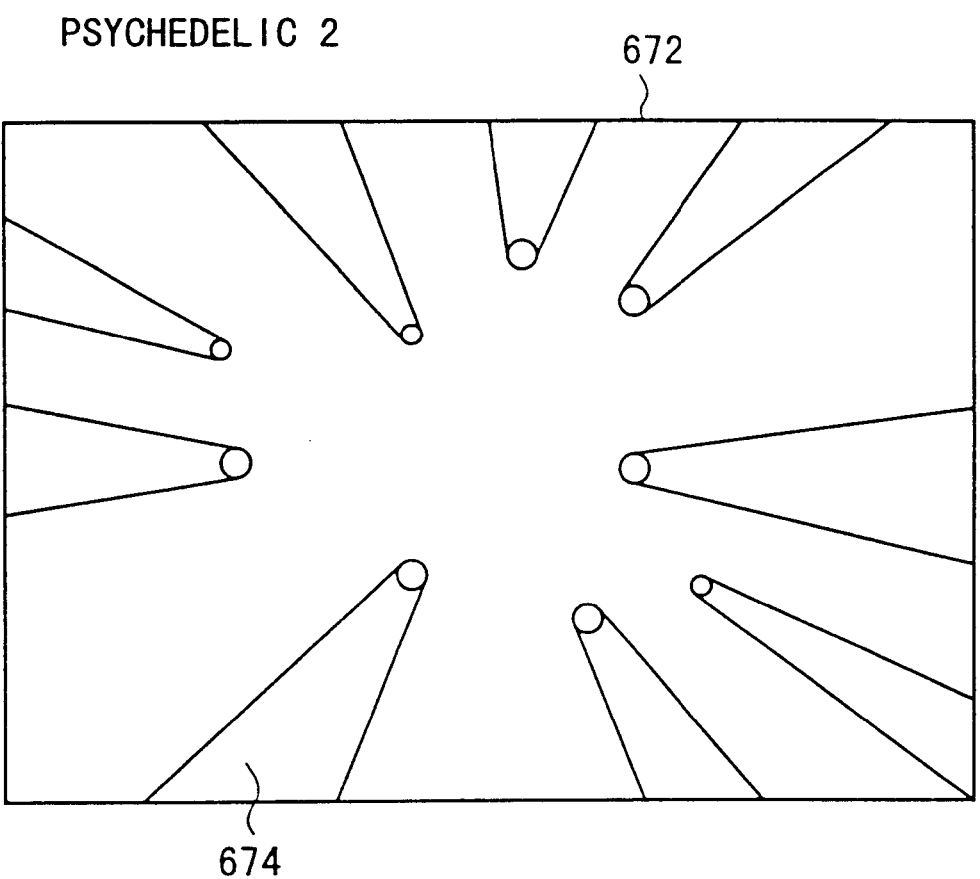
FIG. 28 is a view of an image combined with a special effect as another psychedelic process.

(7) FIG. 28 shows an image 672 combined with a special effect referred to as a psychedelic process 2 when the R1 button 54a is pressed seven times.

As can be seen from the image 672, any background items such as buildings are erased, and after images directed from the outer foreground toward the central background are displayed on characters or fireworks 674 on the display screen.

The psychedelic process 2 is carried out as follows: An image in a preceding frame is enlarged several pixels from the center of the display screen, and the enlarged image is rendered on the present image in a non-transparent manner. This operation is repeated several times.

Figure 29:
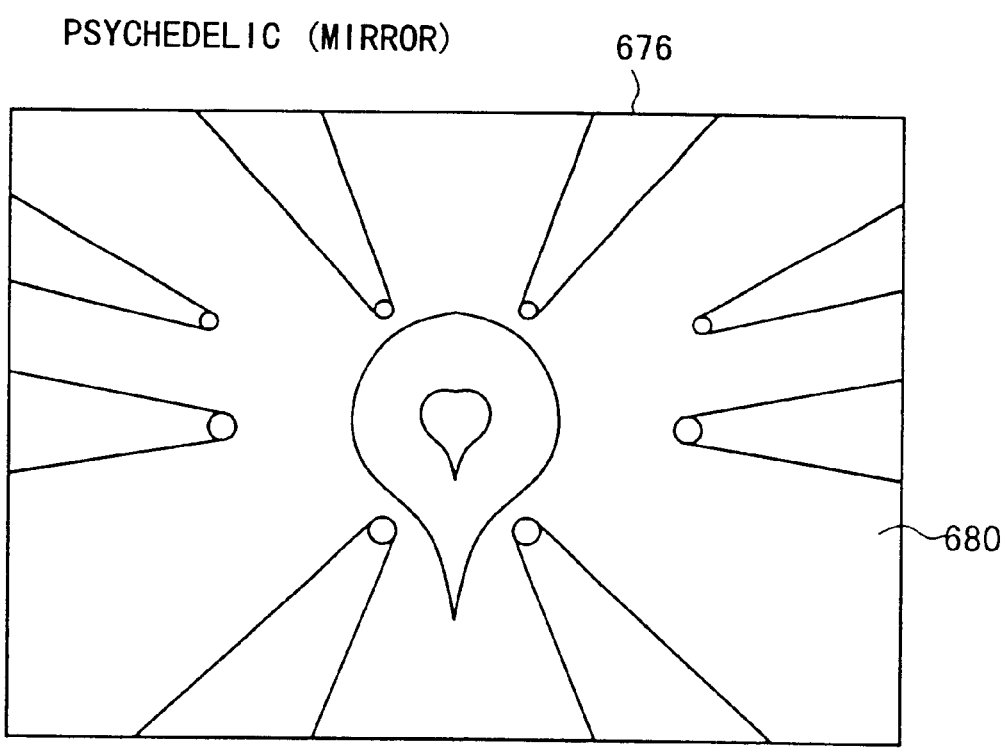
FIG. 29 is a view of an image combined with a special effect as still another psychedelic process.

(8) FIG. 29 shows an image 676 combined with a special effect referred to as a psychedelic mirror process when the R1 button 54a is pressed eight times.

As can be seen from the image 676, the psychedelic mirror process is a more intensified version of the psychedelic process 2, and an image 678 on the left side of the display screen is displayed as an inverted image 680 on the right side of the display screen.

The psychedelic mirror process is carried out as follows: An image in a preceding frame is horizontally inverted, and is enlarged several pixels from the center of the display screen, and the enlarged image is rendered on the present image in a non-transparent manner. This operation is repeated several times.

Image changes caused by control inputs from the R2 button 54d will be described below.

In the default setting, an automatic select function, described below, is turned off, and the color of fireworks is "normal fire". Each time the R2 button 54d is pressed once, a displayed image changes successively through image patterns (1)-(3) shown below. From the image pattern (3), the displayed image returns to the default setting "automatic select: off, normal fire".

(1) "automatic select: on, normal fire", (2) "automatic select: off, colorful fire", (3) "automatic select: on, colorful fire".

The setting "automatic select: on" is a setting in which the CPU 401 automatically randomly selects and determines one of the first through eighth camera work patterns of the hypothetical camera 608 based on the camera motion generating programs corresponding to the control inputs from the direction keys 51a–51d and the control buttons 52a 52d, and the game is replayed according to the determined camera work pattern. The setting "automatic select: off" is a setting in which the camera work pattern is returned to the camera work pattern when the game is executed.

The setting "normal fire" is a setting in which the color of a firework that is set off is red if the firework is red. The setting "colorful fire" is a setting in which the color of a firework that is set off is automatically randomly changed to a color different from the original firework color according to a predetermined color conversion standard, e.g., when a red firework is set off, its color is changed to green or rainbow colors.

Image changes caused by control inputs from the L1 button 53a will be described below.

The default setting is a "fair weather" setting. Each time the L1 button 53a is pressed once, a displayed image changes successively through image patterns (1)–(8) shown below. From the image pattern (8), the displayed image returns to the default setting "fair weather".

(1) "snow" represents a light snowfall. (2) "snow×2" represents a snowfall in an amount that is twice the amount of "snow". (3) "snow×3" represents a snowfall in an amount that is three times the amount of "snow". (4) "snow×4" represents a snowfall in an amount that is four times the amount of "snow". (5) "rain" represents a light rainfall. (6) "rain×2" represents a rainfall in an amount that is twice the amount of "rain". (7) "rain×3" represents a rainfall in an amount that is three times the amount of "rain". (8) "rain×4" represents a rainfall in an amount that is four times the amount of "rain".

Figure 30:
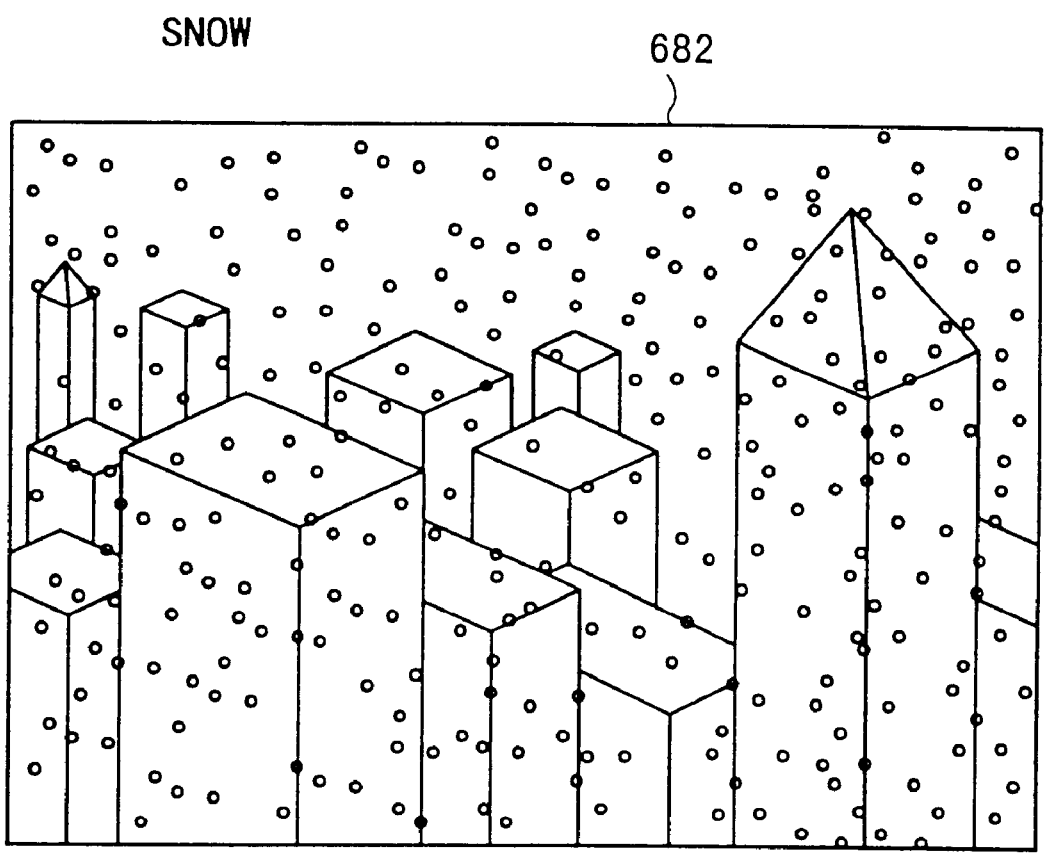
FIG. 30 is a view of an image combined with snow.
Figure 31:
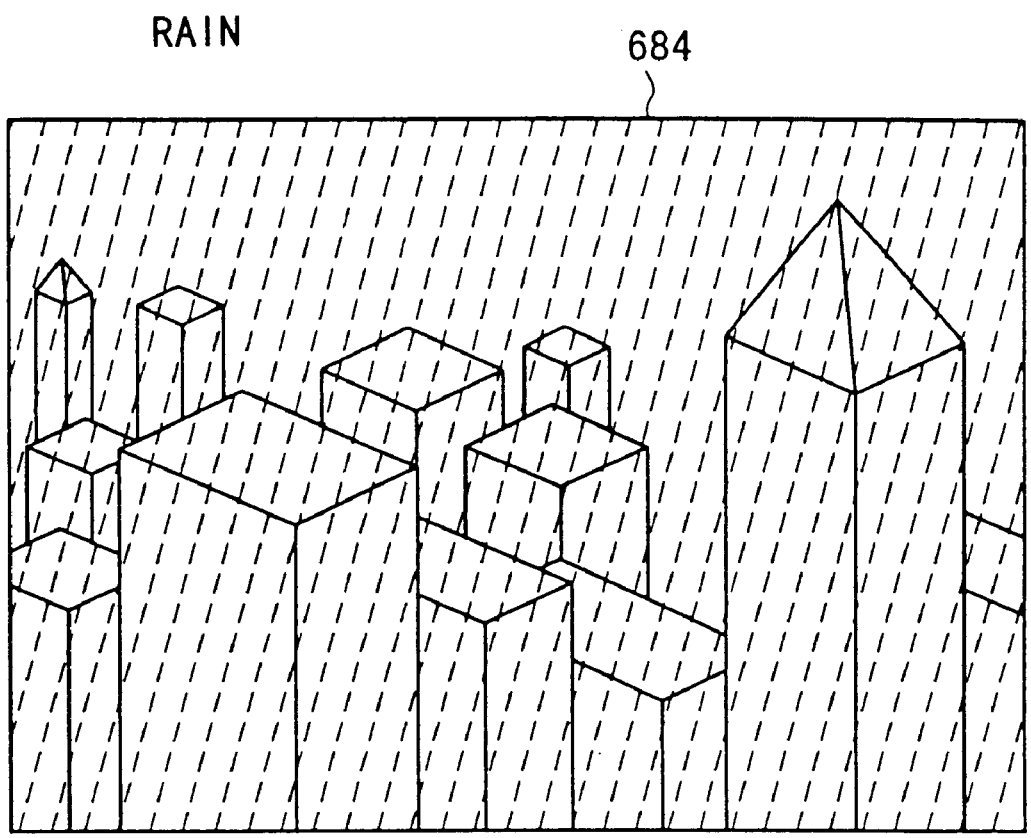
FIG. 31 is a view of an image combined with rain.

FIG. 30 shows an image 682 with a snowfall added thereto. FIG. 31 shows an image 684 with a rainfall added thereto. An image of fireworks is omitted from the monochromatic images 682, 684 (color images in the actual game) shown in FIGS. 30 and 31 as the image of fireworks on those monochromatic images would not clearly be seen.

Image changes caused by control inputs from the L2 button 53b, which also functions as a synthetic display means for synthesizing and displaying a map with a specified camera viewpoint position on the replayed image, will be described below. In the default setting, a map display function to display the map 600 (see FIGS. 6 and 7) in the right lower area of the display screen is turned on, and a function to display the number of times that a firework is successively set off (successive number display function) is turned on. Each time the L2 button 53b is pressed once, a displayed image changes successively through image patterns (1)–(3) shown below. From the image pattern (3), the displayed image returns to the default setting "map display function: on" and "successive number display function: on".

(1) "map display function: off", "successive number display function: off", (2) "map display function: off", "successive number display function: on", (3) "map display function: on", "successive number display function: off".

In step S16 shown in FIG. 17, while the image change is being produced, when the game is replayed, based on the program called in step S15, i.e., while the image change is being reflected in the displayed image, the CPU 401 monitors whether a control input is generated by another control button 102 that is assigned to the generation of an image change or not. Specifically, the CPU 401 monitors whether or not there is an instruction Di (=C2) produced by a control input (key input) from either one of the control buttons 53a, 53b, 54a, 54b, other than the instruction Di (=D1) entered in step S13.

If there is a new instruction Di (=D2), then the CPU 401 holds the image change generating program which is executed based on the present instruction Di (=D1) in step S27, and then control returns to step S14.

In step S14, the CPU 401 reads an image change generating program corresponding to the new instruction Di=D2.

In step S15, the CPU 401 executes the image change generating program which has been read in response to the instruction Di=D2.

In step S16, then, while the image change is being produced, when the game is replayed, based on the program called in step S15, the CPU 401 monitors whether a control input is generated by another control button 102 that is assigned to the generation of an image change or not.

If there is no new instruction Di in step S16, then control goes to step S18 in which the CPU 401 continues the execution of the image change generating program corresponding to the instruction Di=D2, which is called in step S14, and reflects the image change in the displayed image.

In step S19, while the image change produced by the execution of the image change generating program corresponding to the instruction Di=D2 is being reflected in the displayed image, the CPU 401 determines whether or not there is an instruction from the same control button 102 as the control button 102 which has been pressed in step S13 or step S16, i.e., whether there is an instruction Di=D1 or D2 or not.

If there is no instruction Di, or if there is an instruction Di other than the instructions Di=D1, D2, then control goes to step S20. For an easier understanding, it is assumed that there is no instruction Di at the present time.

In step S20, the CPU 401 determines whether the replay of the game is finished or not. If the replay of the game is finished, then control goes back to a game replay menu, and the operation sequence shown in FIG. 17 is put to an end.

If the replay of the game is not finished, then the CPU 401 holds the image change generating program that is currently executed, i.e., the image change generating program corresponding to the instruction Di=D2, and control goes back to step S15 to continue replaying the game based on the image change generating program corresponding to the instruction Di=D2.

If there is an instruction from the same control button 102 as the control button 102 which has been pressed in step S13 or step S16 while the image change produced by the execution of the image change generating program corresponding to the instruction Di=D2 is being reflected in the displayed image, i.e., if there is an instruction Di=D1 or an instruction Di=D2, then control goes to step S22.

In step S22, the CPU 401 reads an image change generating program corresponding to the number of times that the same instruction Di has been entered, i.e., Di=D1+D1 or Di=D2+D2. In step S23, the CPU 401 holds the image change generating program which is presently executed, and control goes back to step S15.

In step S15, the CPU 401 executes the image change generating program which has been called by the instruction Di=D1+D1 or Di=D2+D2, and the produced image change is reflected in the displayed image. The processing from step S16 is thereafter repeated to continuously replay the game until the replay of the game is finished in step S20.

In the above embodiment, various game programs recorded in the optical disk 20 are executed by the entertainment apparatus 12 which has the CPU 401. When a game is replayed by the entertainment apparatus 12 to move a camera viewpoint in three-dimensional computer graphics, as can be seen from the functional block diagram of FIG. 32 which shows an arrangement in principle of the game program, a memory control means 800 (the CPU 401, the IO 409, and the driver 410) successively holds three-dimensional data (data of a capacity that can be held in a usable region of the RAM 402) in a certain replayable region with respect to the present normal camera viewpoint position supplied from the program from the optical disk 20 into a given area of the RAM 402. While the game is being replayed, a camera viewpoint moving means 802 (the CPU 401 and the GS 404) moves the camera view point position of the hypothetical camera 608 on a given path corresponding to an instruction Ci in the replayable region stored in the RAM 402, depending on the instruction Ci corresponding to a given control action from the manual controller 16 which sends instructions to the entertainment apparatus 12 which comprises a computer.

In this manner, it is possible to replay images from various viewpoints with the hypothetical camera 608 that moves on the given path when the game is replayed.

Specifically, in the above embodiment, when the game is replayed, the memory control means 800 holds only the certain replayable region with respect to the present camera viewpoint position successively in the RAM 402. If there is an instruction Ci (I=1, 2, . . . 0) from the manual controller while the game is being replayed, then the camera viewpoint moving means 802 moves the camera viewpoint position of the hypothetical camera 608 on a path corresponding to the instruction Ci among a plurality of predetermined paths. The instruction Ci from the manual controller can be entered interactively when the game is replayed.

According to the present invention, as described above, since an image can be replayed from various viewpoints when games of various genres are replayed, the entertaining capability of the entertainment apparatus is increased upon replaying the game.

For example, when a game is replayed, a camera viewpoint is moved on a given path in the replayable region depending on a control input from the manual controller, so that an image can be replayed from various viewpoints with the camera viewpoint moving on the given path.

The camera viewpoint moving on the given path can be selected interactively by a control action of the manual controller while the game is being replayed.

If a map with a specified camera viewpoint is synthesized and displayed on the replayed image, the position, i.e., the time, to start replaying the game can accurately be confirmed.

With a firework object included in the field of view of the camera, it is possible for the user to see or appreciate the firework from various positions.

Although a certain preferred embodiment of the present invention has been shown and described in detail, it should be understood that various changes and modifications may be made therein without departing from the scope of the appended claims.

What is claimed is:

1. A method of replaying a game, comprising the steps of:
    holding only a certain replayable region with respect to a present camera viewpoint position successively in a memory when a game is replayed to move a camera viewpoint in three-dimensional computer graphics with a computer capable of executing a game program;
    moving said camera viewpoint on a given path in said replayable region in response to a control action of a manual controller which sends instructions to the computer when the game is replayed; and synthesizing and displaying a map in which the camera viewpoint position is specified on an image of the game which is replayed.

2. A method according to claim 1, wherein said step of moving said camera viewpoint comprises the step of:

selecting one of a plurality of said given paths with said manual controller.

3. A method according to claim 1, wherein said step of moving said camera viewpoint comprises the steps of:

when the control action is made by said manual controller, moving the camera viewpoint on said given path from said present camera viewpoint position and thereafter returning the camera viewpoint to said present camera viewpoint position or a position spaced from said present camera viewpoint position by an elapsed time.

4. A method according to claim 1, wherein an firework object is included in the field of view of the camera.

5. A recording medium storing a game program which can be executed by a computer, said game program comprising the steps of:

holding only a certain replayable region with respect to a present camera viewpoint position successively in a memory when a game is replayed to move a camera viewpoint in three-dimensional computer graphics;

moving said camera viewpoint on a given path in said replayable region in response to a control action of a manual controller which sends instructions to the computer when the game is replayed; and synthesizing and displaying a map in which the camera viewpoint position is specified on an image of the game which is replayed.

6. A recording medium according to claim 5, wherein said step of moving said camera viewpoint comprises the step of:

selecting one of a plurality of said given paths with said manual controller.

7. A recording medium according to claim 5, wherein said step of moving said camera viewpoint comprises the steps of:

when the control action made by said manual controller, moving the camera viewpoint on said given path from said present camera viewpoint position and thereafter returning the camera viewpoint to said present camera viewpoint position or a position spaced from said present camera viewpoint position by an elapsed time.

8. A recording medium according to claim 5, wherein an firework object is included in the field of view of the camera.

9. A game program which can be executed by a computer, comprising the steps of:

holding only a certain replayable region with respect to a present camera viewpoint position successively in a memory when a game is replayed to move a camera viewpoint in three-dimensional computer graphics;

moving said camera viewpoint on a given path in said replayable region in response to a control action of a manual controller which sends instructions to the computer when the game is replayed; and synthesizing and displaying a map in which the camera viewpoint position is specified on an image of the game which is replayed.

10. An entertainment system comprising:

an entertainment apparatus for executing various programs;

a manual controller for sending control requests front the user to said entertainment apparatus; and a display unit for displaying a three-dimensional graphics image outputted from said entertainment apparatus;

said entertainment apparatus comprising:

memory control means for holding only a certain replayable region with respect to a present camera viewpoint position successively in a memory when a game is replayed to move a camera viewpoint in three-dimensional computer graphics by said entertainment apparatus;

camera viewpoint moving means for moving said camera viewpoint on a given path in said replayable region in response to a control action of a manual controller which sends instructions to the computer when the game is replayed; and synthesizing and displaying a map in which the camera viewpoint position is specified on an image of the game which is replayed.

11. An entertainment system according to claim 10, wherein said camera viewpoint moving means comprises:

means for allowing said manual controller to select one of a plurality of said given paths.

12. An entertainment system according to claim 10, wherein said camera viewpoint moving means comprises:

means for, when the control action is made by said manual controller, moving the camera viewpoint of said path from said present camera viewpoint position and thereafter returning the camera viewpoint to said present camera viewpoint position or a position spaced from said present camera viewpoint position by an elapsed time.

13. A entertainment system according to claim 10, wherein an firework object is included in the field of view of the camera.

14. A method of replaying a game, comprising the steps of:

storing in memory game data of a game played by a user in a play mode; and displaying a replay image of the game played by the user based on the game data stored in said memory in the replay mode, wherein a camera viewing position and an image effect are controlled by commands inputted by the user in the replay mode for displaying the replay image based on the camera viewing position and the image effect.

15. A method of replaying a game, comprising:

storing in memory game data of a portion of a game played in a play mode;

receiving a replay command to replay the game data stored;

displaying a replay image based on the game data; and displaying a map according to the replay image and a camera viewpoint positioning.

16. The method of claim 15, further comprising;

determining a type of replay instruction received;

identifying a predefined path along which a camera viewpoint is to travel when displayed during a replay mode depending on the type of replay instruction received;

the displaying further comprises displaying the replay image based on the game data according to the predefined path for the camera viewpoint;

interrupting the displaying of the replay image according to the predefined path upon receipt of another replay command; and displaying the replay image based on an alternate camera viewpoint position.

* * * * *